US006506867B1

(12) United States Patent
Lai et al.

(10) Patent No.: US 6,506,867 B1
(45) Date of Patent: Jan. 14, 2003

(54) ELASTIC SUBSTANTIALLY LINEAR ETHYLENE POLYMERS

(75) Inventors: Shih-Yaw Lai, Sugar Land, TX (US);
John R. Wilson, Baton Rouge, LA (US); George W. Knight, Lake Jackson, TX (US); James C. Stevens, Richmond, TX (US)

(73) Assignee: The Dow Chemical Company, Midland, MI (US)

( * ) Notice: Subject to any disclaimer, the term of this patent is extended or adjusted under 35 U.S.C. 154(b) by 167 days.

(21) Appl. No.: 09/691,014

(22) Filed: Oct. 18, 2000

Related U.S. Application Data

(60) Continuation of application No. 08/778,586, filed on Jan. 3, 1997, now Pat. No. 6,136,937, which is a continuation-in-part of application No. 08/166,497, filed on Dec. 13, 1993, now abandoned, which is a continuation-in-part of application No. 08/044,426, filed on Apr. 7, 1993, now Pat. No. 5,380,810, which is a division of application No. 07/939,281, filed on Sep. 2, 1992, now Pat. No. 5,278,272, which is a division of application No. 07/776,130, filed on Oct. 15, 1991, now Pat. No. 5,272,236.

(51) Int. Cl.[7] .................................................. C08F 4/42
(52) U.S. Cl. ................. 526/352; 526/348.1; 526/348.2; 526/348.3; 526/348.4; 526/348.5; 526/348.6; 526/160; 526/943
(58) Field of Search ............................. 526/352, 348.1, 526/348.2, 348.3, 348.4, 348.5, 348.6, 160, 943

(56) References Cited

U.S. PATENT DOCUMENTS

| 3,485,706 A | 12/1969 | Evans ........................ 161/72 |
| 3,491,073 A | 1/1970 | Marinak | |
| 3,645,992 A | 2/1972 | Elston .................... 260/80.78 |
| 3,914,342 A | 10/1975 | Mitchell ................. 260/897 A |
| 4,011,384 A | 3/1977 | Baxmann et al. | |
| 4,076,698 A | 2/1978 | Anderson et al. ........ 526/348.6 |

(List continued on next page.)

FOREIGN PATENT DOCUMENTS

| CA | 2008315 | 7/1990 | |
| EP | 416815 A2 | 3/1991 | ........... C08F/10/00 |

(List continued on next page.)

OTHER PUBLICATIONS

Bersted, *Journal of Applied Polymer Science*, vol. 19, pp. 2167–2177 (1975).
Dealy, J., "Melt Rheology and Its Role in Plastics Processing", p. 597, Van Nostrand Reinhold, (1990).

(List continued on next page.)

Primary Examiner—David W. Wu
Assistant Examiner—Ling-Siu Choi

(57) ABSTRACT

Elastic ethylene polymers are disclosed which have processability similar to highly branched low density polyethylene (LDPE), but the strength and toughness of linear low density polyethylene (LLDPE). The polymers have processing indices (PI's) less than or equal to 70 percent of those of a comparative linear ethylene polymer and a critical shear rate at onset of surface melt fracture of at least 50 percent greater than the critical shear rate at the onset of surface melt fracture of a traditional linear ethylene polymer at about the same $I_2$ and $M_w/M_n$. The novel polymers can also have from about 0.01 to about 3 long chain branches/1000 total carbons and have higher low/zero shear viscosity and lower high shear viscosity than comparative linear ethylene polymers. The novel polymers can also be characterized as having a melt flow ratio, $I_{10}/I_2$, $\geq 5.63$, a molecular weight distribution, $M_w/M_n$, defined by the equation: $M_w/M_n \leq (I_{10}/I_2)-4.63$, a critical shear stress at onset of gross melt fracture greater than about $4 \times 10^6$ dyne/cm$^2$, and a single DSC melt peak between −30 C. and 150 C.

13 Claims, 9 Drawing Sheets

LDPE

HOMOGENEOUS COPOYMERS

LLDPE

SUBSTANTIALLY LINEAR ETHYLENE POLYMERS

U.S. PATENT DOCUMENTS

| | | |
|---|---|---|
| 4,205,021 A | 5/1980 | Morita et al. |
| 4,259,468 A | 3/1981 | Kajiura et al. |
| 4,302,566 A | 11/1981 | Karol et al. |
| 4,303,710 A | 12/1981 | Bullard et al. |
| 4,303,771 A | 12/1981 | Wagner et al. |
| 4,322,027 A | 3/1982 | Reba .......................... 226/97 |
| 4,328,328 A | 5/1982 | Minami et al. |
| 4,339,493 A | 7/1982 | Weiner |
| 4,339,496 A | 7/1982 | Weiner |
| 4,340,563 A | 7/1982 | Appel et al. ................ 262/518 |
| 4,340,640 A | 7/1982 | Weiner |
| 4,340,641 A | 7/1982 | Weiner |
| 4,346,834 A | 8/1982 | Mazumdar |
| 4,349,648 A | 9/1982 | Jorgensen et al. |
| 4,354,009 A | 10/1982 | Goeke et al. |
| 4,359,561 A | 11/1982 | Fraser et al. |
| 4,363,904 A | 12/1982 | Fraser et al. |
| 4,367,256 A | 1/1983 | Biel |
| 4,370,456 A | 1/1983 | George |
| 4,379,197 A | 4/1983 | Cipriani et al. |
| 4,380,567 A | 4/1983 | Shigemoto |
| 4,383,095 A | 5/1983 | Goeke et al. |
| 4,390,677 A | 6/1983 | Karol et al. |
| 4,399,180 A | 8/1983 | Briggs |
| 4,405,774 A | 9/1983 | Miwa et al. |
| 4,410,649 A | 10/1983 | Cieloszyk |
| 4,413,110 A | 11/1983 | Kavesh .................... 526/348.1 |
| 4,418,114 A | 11/1983 | Briggs et al. |
| 4,424,138 A | 1/1984 | Candlin et al. |
| 4,427,573 A | 1/1984 | Miles et al. |
| 4,438,243 A | 3/1984 | Kashiwa et al. |
| 4,452,958 A | 6/1984 | Chester et al. |
| 4,454,281 A | 6/1984 | Heitz et al. |
| 4,461,792 A | 7/1984 | Anthony |
| 4,463,153 A | 7/1984 | Mizutani et al. |
| 4,464,426 A | 8/1984 | Anthony |
| 4,467,065 A | 8/1984 | Williams et al. |
| 4,474,740 A | 10/1984 | Gross et al. |
| 4,482,687 A | 11/1984 | Noshay et al. |
| 4,485,217 A | 11/1984 | Gunter et al. |
| 4,486,579 A | 12/1984 | Machon et al. |
| 4,500,648 A | 2/1985 | Malpass .................... 502/115 |
| 4,505,970 A | 3/1985 | Craver |
| 4,510,303 A | 4/1985 | Oda et al. |
| 4,513,038 A | 4/1985 | Anthony |
| 4,514,465 A | 4/1985 | Schoenberg |
| 4,519,968 A | 5/1985 | Klaus et al. |
| 4,530,914 A | 7/1985 | Ewen et al. |
| 4,532,189 A | 7/1985 | Mueller |
| 4,544,762 A | 10/1985 | Kaminsky et al. .......... 556/179 |
| 4,547,555 A | 10/1985 | Cook et al. |
| 4,551,380 A | 11/1985 | Schoenberg |
| 4,563,504 A | 1/1986 | Hert et al. |
| 4,564,559 A | 1/1986 | Wagner |
| 4,568,713 A | 2/1986 | Hansen et al. |
| 4,587,318 A | 5/1986 | Inoue et al. |
| 4,588,650 A | 5/1986 | Mientus et al. |
| 4,588,794 A | 5/1986 | Oda |
| 4,593,009 A | 6/1986 | Nowlin |
| 4,597,920 A | 7/1986 | Golike |
| 4,598,128 A | 7/1986 | James et al. |
| 4,599,391 A | 7/1986 | Yamamoto et al. |
| 4,613,547 A | 9/1986 | Wagner et al. |
| 4,617,241 A | 10/1986 | Mueller |
| 4,618,662 A | 10/1986 | Nowlin |
| 4,624,991 A | 11/1986 | Haas |
| 4,626,467 A | 12/1986 | Hostetter |
| 4,629,771 A | 12/1986 | Candlin et al. |
| 4,649,001 A | 3/1987 | Nakamura et al. |
| 4,663,220 A | 5/1987 | Wisneski .................... 428/221 |
| 4,666,772 A | 5/1987 | Schinkel et al. |
| 4,666,999 A | 5/1987 | Cook et al. |
| 4,668,566 A | 5/1987 | Braun ........................ 428/286 |
| 4,668,575 A | 5/1987 | Schinkel et al. |
| 4,668,650 A | 5/1987 | Lo et al. |
| 4,668,752 A | 5/1987 | Tominari et al. |
| 4,672,096 A | 6/1987 | Nowlin |
| 4,676,922 A | 6/1987 | Sommer |
| 4,677,087 A | 6/1987 | Lo et al. |
| 4,690,991 A | 9/1987 | Seppl |
| 4,690,992 A | 9/1987 | Grubbs et al. |
| 4,692,386 A | 9/1987 | Schinkel et al. |
| 4,710,538 A | 12/1987 | Jorgensen |
| 4,716,207 A | 12/1987 | Cozewith et al. |
| 4,719,193 A | 1/1988 | Levine et al. |
| 4,720,427 A | 1/1988 | Clauson et al. |
| 4,722,971 A | 2/1988 | Datta et al. |
| 4,732,882 A | 3/1988 | Allen et al. |
| 4,742,138 A | 5/1988 | Kageyama |
| 4,762,898 A | 8/1988 | Matsuura et al. |
| 4,764,549 A | 8/1988 | Greenhalgh et al. |
| 4,775,710 A | 10/1988 | Dunski et al. |
| 4,780,264 A | 10/1988 | Dohrer et al. |
| 4,788,232 A | 11/1988 | Needham |
| 4,789,714 A | 12/1988 | Cozewith et al. |
| 4,792,595 A | 12/1988 | Cozewith et al. |
| 4,798,081 A | 1/1989 | Hazlitt et al. ................... 73/53 |
| 4,803,253 A | 2/1989 | McDaniel et al. |
| 4,808,635 A | 2/1989 | Nguyen |
| 4,820,589 A | 4/1989 | Dobreski et al. |
| 4,824,889 A | 4/1989 | Mostert |
| 4,826,939 A | 5/1989 | Stuart |
| 4,830,926 A | 5/1989 | Mostert |
| 4,833,017 A | 5/1989 | Benoit |
| 4,834,947 A | 5/1989 | Cook et al. |
| 4,842,187 A | 6/1989 | Janocha et al. |
| 4,842,930 A | 6/1989 | Schinkel |
| 4,842,951 A | 6/1989 | Yamada et al. |
| 4,857,611 A | 8/1989 | Durand et al. |
| 4,874,820 A | 10/1989 | Cozewith et al. |
| 4,876,321 A | 10/1989 | Lo et al. |
| 4,882,406 A | 11/1989 | Cozewith et al. |
| 4,883,853 A | 11/1989 | Hobes et al. |
| 4,888,318 A | 12/1989 | Allen et al. |
| 4,892,911 A | 1/1990 | Genske |
| 4,921,920 A | 5/1990 | Collomb-Ceccarini et al. |
| 4,923,750 A | 5/1990 | Jones |
| 4,925,728 A | 5/1990 | Crass et al. |
| 4,935,474 A | 6/1990 | Ewen et al. |
| 4,937,299 A | 6/1990 | Ewen et al. |
| 4,959,436 A | 9/1990 | Cozewith et al. |
| 4,960,878 A | 10/1990 | Crapo et al. ................ 556/179 |
| 4,963,388 A | 10/1990 | Benoit |
| 4,966,951 A | 10/1990 | Benham et al. |
| 4,967,898 A | 11/1990 | Lustig et al. |
| 4,968,765 A | 11/1990 | Yagi et al. |
| 4,975,315 A | 12/1990 | Bolthe et al. |
| 4,981,826 A | 1/1991 | Speca |
| 4,983,447 A | 1/1991 | Crass et al. |
| 4,987,212 A | 1/1991 | Morterol et al. |
| 4,996,094 A | 2/1991 | Dutt |
| 5,006,396 A | 4/1991 | VanBortel et al. |
| 5,013,801 A | 5/1991 | Cozewith et al. |
| 5,015,511 A | 5/1991 | Treybig et al. |
| 5,015,749 A | 5/1991 | Schmidt et al. ............. 556/179 |
| 5,019,315 A | 5/1991 | Wilson |
| 5,024,799 A | 6/1991 | Harp et al. |
| 5,025,072 A | 6/1991 | Nowlin et al. |
| 5,026,798 A | 6/1991 | Canich ........................ 526/127 |
| 5,041,316 A | 8/1991 | Parnell et al. |
| 5,041,583 A | 8/1991 | Sangokoya ................. 556/179 |

| | | |
|---|---|---|
| 5,043,040 A | 8/1991 | Butler |
| RE33,683 E | 9/1991 | Allen et al. |
| 5,047,468 A | 9/1991 | Lee et al. |
| 5,055,338 A | 10/1991 | Sheth et al. |
| 5,055,438 A | 10/1991 | Canich .................... 502/117 |
| 5,055,533 A | 10/1991 | Allen et al. |
| 5,055,534 A | 10/1991 | Theobald |
| 5,059,481 A | 10/1991 | Lustig et al. |
| 5,064,796 A | 11/1991 | Speca |
| 5,064,802 A | 11/1991 | Stevens et al. ............ 502/155 |
| 5,068,489 A | 11/1991 | Edwards et al. |
| 5,073,452 A | 12/1991 | Satou et al. |
| 5,082,908 A | 1/1992 | Imai et al. |
| 5,084,039 A | 1/1992 | Cancio et al. |
| 5,084,540 A | 1/1992 | Albizzati et al. |
| 5,084,927 A | 2/1992 | Parkevich |
| 5,086,024 A | 2/1992 | Antberg et al. ............ 526/126 |
| 5,096,867 A * | 3/1992 | Canich .................... 502/103 |
| 5,132,380 A | 7/1992 | Stevens et al. ............ 526/126 |
| 5,218,071 A | 6/1993 | Tsutsui et al. ............. 526/348 |
| 5,272,236 A | 12/1993 | Lai et al. ................. 526/348.5 |
| 5,322,728 A | 6/1994 | Davey et al. |
| 5,334,446 A | 8/1994 | Quantrille et al. |
| 5,382,630 A | 1/1995 | Stehling et al. |
| 5,382,631 A | 1/1995 | Stehling et al. |
| 5,393,599 A | 2/1995 | Quantrille et al. |

FOREIGN PATENT DOCUMENTS

| | | | |
|---|---|---|---|
| EP | 0416815 A2 | 3/1991 | |
| EP | 520732 A1 | 12/1992 | .......... C08L/10/00 |
| WO | WO 85/04664 | 10/1985 | ............ C08F/8/50 |
| WO | 85/04664 | 10/1985 | |
| WO | 9003414 | 4/1990 | |
| WO | WO 90/03414 | 4/1990 | .......... C08L/23/08 |
| WO | WO 93/07187 | 4/1993 | .......... C08F/10/02 |
| WO | WO 93/07188 | 4/1993 | .......... C08F/10/02 |
| WO | WO 93/07189 | 4/1993 | .......... C08F/10/02 |
| WO | 94/07930 | 4/1994 | |

OTHER PUBLICATIONS

Ramamurthy, *Journal of Rheology*, "Wall Slip in Viscous Fluids and Influence of Materials of Construction", 30(2), 337–357 (1986).

Moynihan, Baird and Ramanathan, *Journal of Non–Newtonian Fluid Mechanics*, 36, 255–263 (1990).

Kalika and Denn, *Journal of Rheology*, 31, 815–834 (1987).

Exxon Chemical Company, Preprints of Polyolefins VII International Conference, pp. 45–66, Feb. 24–27, 1991.

Hendewerk and Spenadel, IEEE meeting, Dallas, TX, Sep. 1991.

Van der Sanden and Halle, *Tappi Journal*, "A New Family of Linear Ethylene Polymers Provides Enhanced Sealing Performance".

Randall, *Rev. Macromol. Chem. Phys.*, C29 (2&3), p. 285–297.

Wild, et al, *Journal of Polymer Science, Poly. Phys. Ed.*, Vols. 20, p. 441 (1982).

Dealy, J., "Rheometers for Molten Plastics", pp. 250–251, Van Norstrand Reinhold Co. (!982).

Williams and Ward, *Journal of Polymer Science, Polymer Letters*, vol. 6, 621 (1968).

Shida, Shroff and Cancio, *Polym. Eng. Sci.*, "Correlation of Low Density Polyethylene Rheological Measurements with Optical and Processing Properties", vol. 17, p. 770 (Nov. 77).

Dealy, J., Rheometers for Molten Plastics, pp. 97–99, Van Norstrand Reinhold, Co., (1982).

Marks, et al., *J. Am. Chem. Soc.*, 113, pp. 3623–3625 (1991).

Fendrick, et al., *Organometallics*, 3, 819 (1984).

L.E. Manzer, *Inorg. Syn.*, 21, 135 (1982).

*Journal of Polymer Science*, Part A, vol. 1 (pp. 2869–2880 (1963)), "Long–Chain Branching Frequency in Polyethylene" J. E. Guillet.

*Polymer Preprints, Amer. Chem. Society*, vol. 12, No. 1, pp. 277–281 (Mar. 1971), "Evidence of Long–Chain Branching in High Density Polyethylene" by E. E. Drott and R. A. Mendelson.

*Journal of the American Chemical Society*, 98:7, pp. 1729–1742 (Mar. 31, 1976) "Structure and Chemistry of Bis(cyclopentadienyl)–MLn Complexes" by Joseph W. Lauher and Roald Hoffman.

*Polymer Engineering and Science*, vol. 16, No. 12, pp. 811–816 (Dec. 1976), "Influence of Long–Chain Branching on the Viscoelastic Properties of Low–Density Polyethylenes" by L. Wild, R. Ranganath, and D. Knobeloch.

*Angew. Chem. Int. Ed. Engl*, pp. 630–632 (1976) vol. 15, No. 10 "Halogen–Free Soluble Ziegler Catalysts for the Polymerization of Ethylene. Control of Molecular Weight by Choice of Temperature" by Arne Andresen et al.

*Advances in Organometallic Chemistry*, pp. 99–148, vol. 18, (1980) "Ziegler–Natta Catalysis" by Hansjorg Sinn and Walter Kaminsky.

*Angew. Chem. Int. Ed. Eng.*, pp. 390–393, vol. 19 No. 5 (1980) "Living Polymers' on Polymerization with Extremely Productive Ziegler Catalysts" by Hansjorg Sinn, Walter Kaminsky, Hans–Jurgen Vollmer, and Rudiger Woldt.

*Polymer Bullentin*, 9, pp. 464–469 (1983) "Halogen Free Soluble Ziegler Catalysts with Methylalumoxan as Catalyst" by Jens Herwig and Walter Kaminsky.

*Makromol. Chem., Rapid Commun.*, 4, pp. 417–421 (1983) "Bis(cyclopentadienyl)zirkon–Verbingungen und Aluminoxan als Ziegler–Katalysatoren fur die Polymerisation und Copolymerisation von Olefinen" by Walter Kaminsky et al.

*ANTEC Proceedings*, pp. 306–309 (1983), "Analysis of Long Chain Branching in High Density Polyethylene" by J.K. Hughes.

*Makromol. Chem., Rapid Commun.*, (5) pp. 225–228 (1984) "Influence of hydrogen on the polymerization of ethylene with the homogenous Ziegler system bis(cyclopentadienyl)zirconiumdicholoride/aluminoxane" by Walter Kaminsky et al.

*Journal of Polymer Science: Polymer Chemistry Edition*, pp. 2117–2133 (1985) vol. 23, "Homogeneous Ziegler–Natta Catalysis, II, Ethylene Polymerization by IVB Transition Metal Complexes/Methyl Aluminoxane Catalyst Systems" by E. Giannetti and R. Mazzocchi.

*Journal of Applied Polymer Science*, pp. 3751–3765 (1985) vol. 30, "On the Effects of Very Low Levels of Long Chain Branching on Rheological Behavior in Polyethylene" by B. H. Bersted.

*Journal of Polymer Science: Polymer Chemistry Edition*, pp. 2151–2164 (1985) vol. 23, "Ethylene Propylene Diene Terpolymers Produced with a Homogeneous and Highly Active Zirconium Catalyst" by Walter Kaminsky et al.

*The Society of Rheology*, pp. 337–357 (1986) vol. 30, "Wall Slip iun Viscous Fluids and Influence of Materials of Construction" by A. V. Ramamurthy.

*Makromol. Chem., Macromol. Symp.*, 4, pp. 103–118 (1986) "Elastomers By Atactic Linkage of α–Olefins Using Soluble Ziegler Catalysts" by W. Kaminsky and M. Schlobohm.

*Journal of Rheology*, 31 (8) pp. 815–834 (1987) "Wall Slip and Extrudate Distortion in Linear Low–Density Polyethylene" by D. Kalika and M. Denn.

*Makromol. Chem.*, 190, pp. 515–526 (1989) "Copolymerization of Cycloalkenes with Ethylene In Prescence of Chiral Zirconocene Catalysts" by W. Kaminsky and R. Spiehl.

*Journal of Macromolecules Science: Reviews in Macromolecular Chemistry and Physics*, C29(2&3), pp. 201–303 (1989) "A Review of High Resolution Liquid $^{13}$Carbon Nuclear Magnetic Resonance Characterization of Ethylene––Based Polymers".

*Journal of Non–Newtonian Fluid Mechanics*, 36, pp. 255–263 (1990) "Additional Observations on The Surface Melt Fracture Behavior Of Linear Low–Density Polyethylene" by R. Moynihan, D. Baird, and R. Ramanathan.

*Makromol. Chem. Rapid Commun.*, pp. 89–94 (1990) "Terpolymers of Ethylene, Propene and 1,5–Hexadiene Synthesized with Zirconocene/Methylaluminoxane" by W. Kaminsky and H. Drogemuller.

*Journal of Rheology, 35 (4), 3 (May, 1991)* pp. 497–52, "Wall Slip of Molten High Density Polyethylene, I. Sliding Plate Rheometer Studies" by S. G. Hatzikiriakos and J. M. Dealy.

*Proceedings of the 1991 IEEE Power Engineering Society*, pp. 184–190 (Sep. 22–27, 1991), "New Specialty Linear Polymers (SLP) For Power Cables" by Monica Hendewerk and Lawrence Spenadel.

*Society of Plastic Engineers Proceedings*, Polyolefins VII International Conference, Feb. 24–27, 1991, "Structure/ Property Relationships In Exxpol™ Polymers" (pp. 45–66) by C. Speed, B. Trudell, A. Mehts, and F. Stehling.

*1991 Specialty Polyolefins Conference Proceedings*, "The Marketing Challenge Created By Single Site Catalysts in Polyolefins," Sep. 24, 1991, (pp. 41–45) by Michael P. Jeffries.

*High Polymers*, vol. XX, "Crystalline Olefin Polymers" Part I, pp. 495–501.

*1991 Polymers, Laminations & Coatings Conference*, TAPPI Proceedings, presented in Feb., 1991, pp. 289–296, "A New Family of Linear Ethylene Polymers with Enhanced Sealing Performance" by D. Van der Sanden and R. W. Halle.

*Society of Plastic Engineers 1991 Specialty Polyolefins Conference Proceedings*, pp. 41–55, "The Marketing Challenge Created by Single Site Catalysts in Polyolefins" by M. Jefferies (Sep. 24, 1991).

*Advances In Polyolefins*, by R. B. Seymour and T. Cheng, (1987), pp. 373–380 "Crystallinity and Morphology of Ethylene/α–Olefin Copolymers" by P. Schouterden, G. Groenirickx, and H. Reynaers.

*Advances In Polyolefins*, by R. B. Seymour and T. Cheng (1987) "New Catalysis and Process For Ethylene Polymerization", pp 337–354, by F. Karol, B. Wagner, I. Levine, G. Goeke, and A. Noshay.

*Advances In Polyolefins*, by R.B. Seymour and T. Cheng, (1987) "Polymerization of Olefins With A Homogeneous Zirconium/Alumoxane Catalyst", pp. 361–371 by W. Kaminsky and H. Hahnsen.

\* cited by examiner

ELASTIC SUBSTANTIALLY LINEAR ETHYLENE POLYMERS

CROSS REFERENCE TO RELATED APPLICATION

This application is a continuation of U.S. application Ser. No. 08/778,586 filed Jan. 3, 1997, now U.S. Pat. No. 6,136,937, which is a continuation-in-part of U.S. application Ser. No. 08/044,426 filed Apr. 7, 1993, now U.S. Pat. No. 5,380,810, which is a divisional of U.S. application Ser. No. 07/776,130 filed Oct. 15, 1991, now U.S. Pat. No. 5,272,236. This application is also a continuation-in-part of U.S. application Ser. No. 08/166,497 filed Dec. 13, 1993, now abandoned, which is a divisional of U.S. application Ser. No. 07/939,281 filed Sep. 2, 1992 which is now U.S. Pat. No. 5,278,272.

FIELD OF THE INVENTION

This invention relates to elastic substantially linear ethylene polymers having improved processability, e.g., low susceptibilty to melt fracture, even under high shear stress conditions. Such substantially linear ethylene polymers have a critical shear rate at the onset of surface melt fracture substantially higher than, and a processing index substantially less than, that of a linear polyethylene at the same molecular weight distribution and melt index.

BACKGROUND OF THE INVENTION

Molecular weight distribution (MWD), or polydispersity, is a well known variable in polymers. The molecular weight distribution, sometimes described as the ratio of weight average molecular weight ($M_w$) to number average molecular weight ($M_n$) (i.e., $M_w/M_n$) can be measured directly, e.g., by gel permeation chromatography techniques, or more routinely, by measuring $I_{10}/I_2$ ratio, as described in ASTM D-1238. For linear polyolefins, especially linear polyethylene, it is well known that as $M_w/M_n$ increases, $I_{10}/I_2$ also increases.

John Dealy in "Melt Rheology and Its Role in Plastics Processing" (Van Nostrand Reinhold, 1990) page 597 discloses that ASTM D-1238 is employed with different loads in order to obtain an estimate of the shear rate dependence of melt viscosity, which is sensitive to weight average molecular weight ($M_w$) and number average molecular weight ($M_n$).

Bersted in Journal of Applied Polymer Science Vol. 19, page 2167–2177 (1975) theorized the relationship between molecular weight distribution and steady shear melt viscosity for linear polymer systems. He also showed that the broader MWD material exhibits a higher shear rate or shear stress dependency.

Ramamurthy in *Journal of Rheology*, 30(2), 337–357 (1986), and Moynihan, Baird and Ramanathan in Journal of Non-Newtonian Fluid Mechanics, 36, 255–263 (1990), both disclose that the onset of sharkslin (i.e., surface melt fracture) for linear low density polyethylene (LLDPE) occurs at an apparent shear stress of 1–1.4×10$^6$ dyne/cm$^2$, which was observed to be coincident with the change in slope of the flow curve. Ramamurthy also discloses that the onset of surface melt fracture or of gross melt fracture for high pressure low density polyethylene (HP-LDPE) occurs at an apparent shear stress of about 0.13 MPa (1.3×10$^6$ dyne/cm). Ramnamurthy also discloses that "the corresponding shear stresses (0.14 and 0.43 MPa) for linear polyethylenes are widely separated." However, these LLDPE resins are linear resins, and are believed to be those made by Union Carbide in their UNIPOL process (which uses conventional Ziegler-Natta catalysis which results in a heterogeneous comonomer distribution). The LLDPE is reported in Tables I and II to have a broad $M_w/M_n$ of 3.9. The melt fracture tests conducted by Ramamurthy were in the temperature range of 190 to 220 C. Furthermore, Ramamurthy reports that the onset of both surface and gross melt fracture (for LLDPE resins) are ". . . essentially independent of MI (or molecular weight), melt temperature, die diameter (0.5–2.5 mm), die length/diameter ratio (2–20), and the die entry angle (included angle: 60–180 degrees)."

Kalika and Denn in *Journal of Rheology*, 31, 815–834 (1987) confirmed the surface defects or sharkskin phenomena for LLDPE, but the results of their work determined a critical sheer stress at onset of surface melt fracture of 0.26 MPa, significantly higher than that found by Ramamurthy and Moynihan et al. Kalika and Denn also report that the onset of gross melt fracture occurs at 0.43 MPa which is consistent with that reported by Ramamurthy. The LLDPE resin tested by Kalika and Denn was an antioxidant-modified (of unknown type) UNIPOL LLDPE having a broad $M_w/M_n$ of 3.9. Kalika and Denn performed their melt fracture tests at 215 C. However, Kalika and Denn seemingly differ with Ramamurthy in the effects of their L/D of the rheometer capillary. Kalika and Denn tested their LLDPE at L /D's of 33.2, 66.2, 100.1, and 133.1 (see Table 1 and FIGS. 5 and 6).

International Patent Application (Publication No. WO 90/03414) published Apr. 5, 1990 to Exxon Chemical Company, discloses linear ethylene interpolymer blends with narrow molecular weight distribution and narrow short chain branching distributions (SCBDs). The melt processibility of the interpolymer blends is controlled by blending different molecular weight interpolymers having different narrow molecular weight distributions and different SCBDS.

Exxon Chemical Company, in the Preprints of Polyolefins VII International Conference, page 45–66, Feb. 24–27 1991, disclose that the narrow molecular weight distribution (NMWD) resins produced by their EXXPOL™ technology have higher melt viscosity and lower melt strength than conventional Ziegler resins at the same melt index. In a recent publication, Exxon Chemical Company has also taught that NMWD polymers made using a single site catalyst create the potential for melt fracture ("New Specialty Linear Polymers (SLP) For Power Cables," by Monica Hendewerk and Lawrence Spenadel presented at IEEE meeting in Dallas, Tex., September, 1991). In a similar vein, in "A New Family of Linear Ethylene Polymers Provides Enhanced Sealing Performance" by Dirk G. F. Van der Sanden and Richard W. Halle, (February 1992 Tappi Journal), Exxon Chemical Company has also taught that the molecular weight distribution of a polymer is described by the polymers melt index ratio (i.e., $I_{10}/I_2$) and that their new narrow molecular weight distribution polymers made using a single site catalyst are "linear backbone resins containing no functional or long chain branches."

U.S. Pat. No. 5,218,071 (Canadian patent application 2,008,315-A) to Mitsui Petrochemical Industries, Ltd., teaches ethylene copolymers composed of structural units (a) derived from ethylene and structural units (b) derived from alpha-olefins of 3–20 carbons atoms, said ethylene copolymers having [A] a density of 0.85–0.92 g/cm$^3$, [B] an intrinsic viscosity as measured in decalin at 135 C of 0.1 –10 dl/g, [C] a ratio ($M_w/M_n$) of a weight average molecular weight ($M_w$) to a number average molecular weight ($M_n$) as measured by GPC of 1.2–4, and [D] a ratio (MFR$_{10}$/MFR$_2$)

of $MFR_{10}$ under a load of 10 kg to $MFR_2$ under a load of 2.16 kg at 190 C. of 8–50, and being narrow in molecular weight distribution and excellent in flowability. However, the ethylene copolymers of U.S. Pat. No. '071 are made with a catalysis system composed of methylaluminoxane and ethylenebis(indenyl)hafnium dichloride (derived from $HfCl_4$ containing 0.78% by weight of zirconium atoms as containates). It is well known that mixed metal atom catalyst species (such as hafnium and zirconium in U.S. Pat. No. '071) polymerizes copolymer blends, which are evidence by multiple melting peaks. Such copolymer blends therefore are not homogeneous in terms of their branching distribution.

WO 85/04664 to BP Chemicals Ltd. teaches a process for the thermo-mechanical treatment of copolymers of ethylene and higher alpha-olefins of the linear low density polyethylene type with at least one or more organic peroxides to produce copolymers that are particularly well suited for extrusion or blow-molding into hollow bodies, sheathing, and the like. These treated copolymers show an increased flow parameter ($I_{21}/I_2$) without significantly increasing the $M_w/M_n$. However, the novel polymers of the present invention have long chained branching and obtained this desirable result without the need of a peroxide treatment.

U.S. Pat. No. 5,096,867 discloses various ethylene polymers made using a single site catalyst in combinations with methyl aluminoxane. These polymers, in particular Example 47, have extremely high levels of aluminum resulting from catalyst residue. When these aluminum residues are removed from the polymer, the polymer exhibits gross melt fracture at a critical shear stress of less than $4 \times 10^6$ $dyne/cm^2$.

All of the foregoing patents, applications, and articles are herein incorporated by reference.

Previously known narrow molecular weight distribution linear polymers disadvantageously possessed low shear sensitivity or low $I_{10}/I_2$ value, which limits the extrudability of such polymers. Additionally, such polymers possessed low melt elasticity, causing problems in melt fabrication such as film forming processes or blow molding processes (e.g., sustaining a bubble in the blown film process, or sag in the blow molding process etc.). Finally, such resins also experienced melt fracture surface properties at relatively low extrusion rates thereby processing unacceptably.

SUMMARY OF THE INVENTION

A new class of homogeneous ethylene polymers have now been discovered which have long chain branching and unusual but desirable bulk properties. These new polymers include both homopolymers of ethylene and interpolymers of ethylene and at least one alpha-olefin. Both the homo- and interpolymers have long chain branching, but the interpolymers have short chain branching in addition to the long chain branching. The short chain branches are the residue of the alpha-olefins that are incorporated into the polymer backbone or in other words, the short chain branches are that part of the alpha-olefin not incorporated into the polymer backbone. The length of the short chain branches is two carbon atoms less than the length of the alpha-olefin comonomer. The short chain branches are randomly, i.e. uniformitly, distributed throughout the polymer as opposed to heterogeneously branched ethylene/alpha-olefin interpolymers such as conventional Zeigler LLDPE.

These novel ethylene polymers have a shear thinning and ease of processability similar to highly branched low density polyethylene (LDPE), but with the strength and toughness of linear low density polyethylene (LLDPE). These novel ethylene polymers can also be characterized as "substantially linear" polymers, whereby the bulk polymer has an average of up to about 3 long chain branches/1000 total carbons or in other words, at least some of the polymer chains have long chain branching. The novel substantially linear ethylene polymers are distinctly different from traditional Ziegler polymerized heterogeneous polymers (e.g., LLDPE) and are also different from traditional free radical/high pressure polymerized LDPE. Surprisingly, the novel substantially linear ethylene polymers are also different from linear homogeneous ethylene polymers having a uniform comonomer distribution, especially with regard to processability.

These novel ethylene polymers, especially those with a density greater than or equal to about 0.9 $g/cm^3$ are characterized as having:
a) a melt flow ratio, $I_{10}/I_2$, $\geq 5.63$,
b) a molecular weight distribution, $M_w/M_n$, defined by the equation:

$$M_w/M_n \leq (I_{10}/I_2) - 4.63,$$

c) a critical shear stress at onset of gross melt fracture greater than about $4 \times 10^6$ $dyne/cm^2$, and
d) a single melt peak as determined by differential scanning calorimetry (DSC) between −30 and 150 C.

The novel ethylene polymers can also be characterized as having:
a) a melt flow ratio, $I_{10}/I_2$, $\geq 5.63$,
b) a molecular weight distribution, $M_w/M_n$, defined by the equation:

$$M_w/M_n \leq (I_{10}/I_2) - 4.63,$$

c) a critical shear rate at onset of surface melt fracture at least 50 percent greater than the critical shear rate at the onset of surface melt fracture of a linear ethylene polymer with an $I_2$, $M_w/M_n$, and density each within ten percent of the novel ethylene polymer, and
d) a single melt peak as determined by differential scanning calorimetry (DSC) between −30 and 150 C.

In another aspect, the novel ethylene polymers, especially those having a density greater than or equal to about 0.9 $g/cm^3$, are characterized as having:
a) a melt flow ratio, $I_{10}/I_2$, $\geq 5.63$, and
b) a molecular weight distribution, $M_w/M_n$ of from about 1.5 to about 2.5,
c) a critical shear stress at onset of gross melt fracture greater than about $4 \times 10^6$ $dyne/cm^2$, and
d) a single melt peak as determined by differential scanning calorimetry (DSC) between −30 and 150 C.

In still another aspect, the novel ethylene polymers are characterized as having:
a) a melt flow ratio, $I_{10}/I_2$, $\geq 5.63$,
b) a molecular weight distribution, $M_w/M_n$ of from about 1.5 to about 2.5,
c) a critical shear rate at onset of surface melt fracture of at least 50 percent greater than the critical shear rate at the onset of surface melt fracture of a linear ethylene polymer with an $I_2$, $M_w/M_n$, and density each within ten percent of the novel ethylene polymer, and
d) a single melt peak as determined by differential scanning calorimetry (DSC) between −30and 150 C.

The substantially linear ethylene polymers can also be characterized as having a critical shear rate at onset of surface melt fracture of at least 50 percent greater than the critical shear rate at the onset of surface melt fracture of a linear ethylene polymer having an $I_2$, $M_w/M_n$ and density each within ten percent of the substantially linear ethylene polymer.

In still another aspect the novel polymer can be characterized as a substantially linear ethylene bulk polymer having:

(a) and average of about 0.01 to about 3 long chain branches/1000 total carbons, (b) a critical shear stress at onset of gross melt fracture of greater than about $4 \times 10^6$ dyne/cm$^2$, and (c) a single DSC melt peak between −30 and 150 C.

The substantially linear ethylene bulk polymer can also be characterized as having:

(a) an average of about 0.01 to about 3 long chain branches/1000 total carbons, (b) a critical shear rate at onset of surface melt fracture of at least 50 percent greater than the critical shear rate at the onset of surface melt fracture of a linear ethylene polymer having an $I_2$, $M_w/M_n$ and density each within ten percent of the substantially linear ethylene bulk polymer, and (c) a single DSC melt peak between −30 and 150 C.

In still another aspect, the ethylene polymer can be characterized as a substantially linear ethylene bulk polymer having:

(a) average of about 0.01 to about 3 long chain branches/1000 total carbons, (b) a melt flow ratio, $I_{10}/I_2$, $\geq 5.63$, (c) a molecular weight distribution, $M_w/M_n$, from about 1.5 to about 2.5, and (d) a single DSC melt peak between −30 and 150 C.

The novel ethylene polymers, especially the substantially linear ethylene polymers, also have a processing index (PI) less than or equal to about 70 percent of the PI of a linear ethylene polymer at about the same $I_2$, $M_w/M_n$, and density each within ten percent of the novel ethylene polymer.

Compositions comprising the novel ethylene polymer and at least one other natural or synthetic polymer are also within the scope of the invention.

Elastic substantially linear ethylene polymers comprising ethylene homopolymers or an interpolymer of ethylene with at least one $C_3$–$C_{20}$ alpha-olefin copolymers are especially preferred.

DETAILED DESCRIPTION OF THE INVENTION

Figure 9:
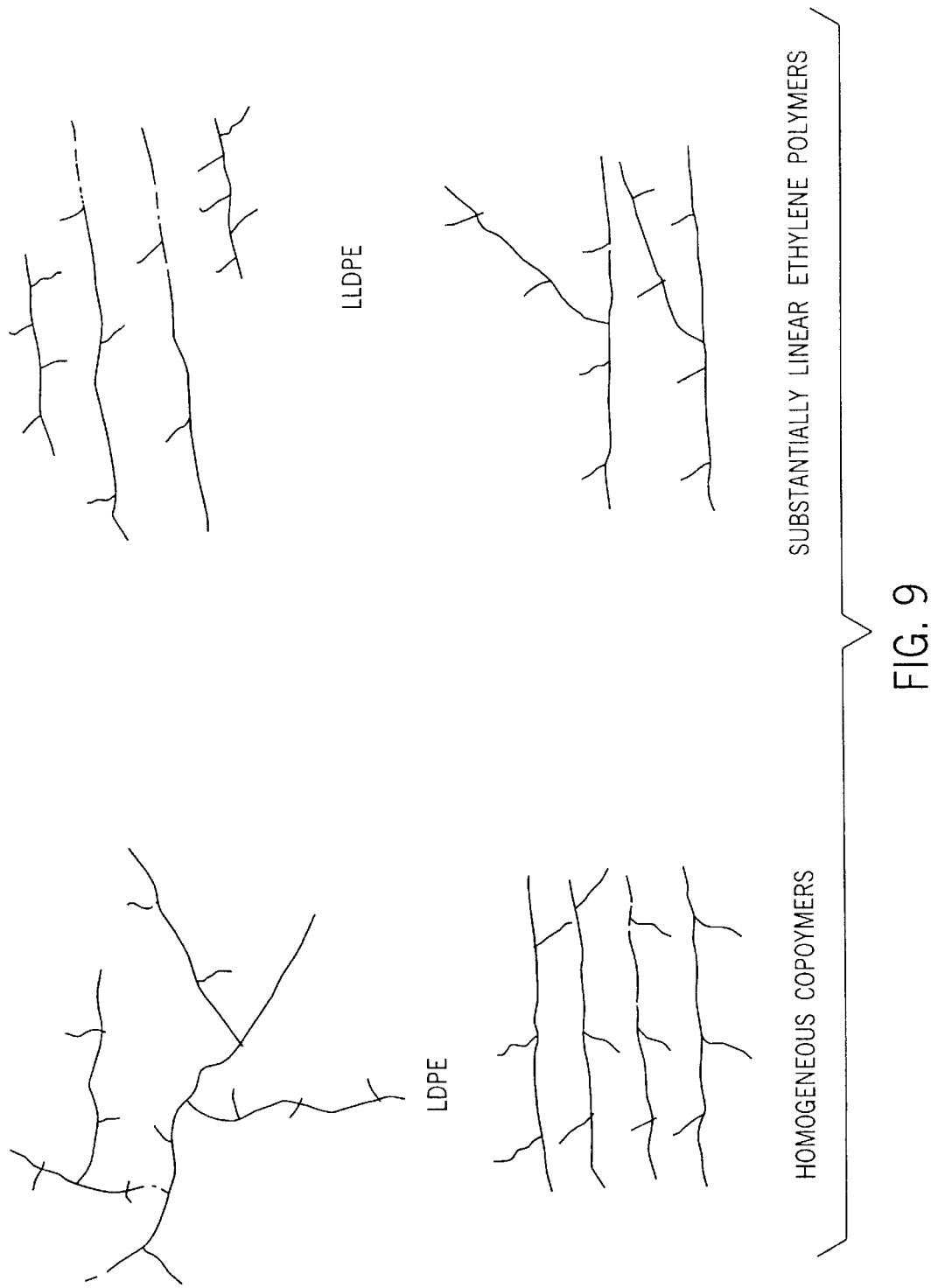
FIG. 9 graphically displays the structural characteristics of a traditional heterogeneous Ziegler polymerized LLDPE copolymers, a highly branched high pressure-free radical LDPE, and a novel substantially linear ethylene/alpha-olefin copolymer of the invention.

The term "linear" as used herein means that the ethylene polymer does not have long chain branching. That is, the polymer chains comprising the bulk linear ethylene polymer have an absence of long chain branching, as for example the traditional linear low density polyethylene polymers or linear high density polyethylene polymers made using Ziegler polymerization processes (e.g., U.S. Pat. No. 4,076,698 (Anderson et al.)), sometimes called heterogeneous polymers. The term "linear" does not refer to bulk high pressure branched polyethylene, ethylene/vinyl acetate copolymers, or ethylene/vinyl alcohol copolymers which are known to those skilled in the art to have numerous long chain branches. The term "linear" also refers to polymers made using uniform branching distribution polymerization processes, sometimes called homogeneous polymers, including narrow MWD (e.g. about 2) made using single site catalysts. Such uniformly branched or homogeneous polymers include those made as described in U.S. Pat. No. 3,645,992 (Elston) and those made using so-called single site catalysts in a batch reactor having relatively high ethylene concentrations (as described in U.S. Pat. No. 5,026,798 (Canich) or in U.S. Pat. No. 5,055,438 (Canich)) or those made using constrained geometry catalysts in a batch reactor also having relatively high olefin concentrations (as described in U.S. Pat. No. 5,064,802 (Stevens et al.) or in EP 0 416 815 A2 (Stevens et al.)). The uniformly branched/homogeneous polymers are those polymers in which the comonomer is randomly distributed within a given interpolymer molecule or chain, and wherein substantially all of the interpolymer molecules have the same ethylene/comonomer ratio within that interpolymer, but these polymers too have an absence of long chain branching, as, for example, Exxon Chemical has taught in their February 1992 Tappi Journal paper. For example, FIG. 9 shows the structural differences among conventional heterogeneously branched LLDPE, homogeneously branched linear LLDPE, highly branched high pressure, free radical LDPE, and the homogeneously branched substantially linear ethylene polymers of the present invention.

The term "substantially linear" as used means that the bulk polymer is substituted, on average, with about 0.01 long chain branches/1000 total carbons (including both backbone and branch carbons) to about 3 long chain branches/1000 total carbons. Preferred polymers are substituted with about 0.01 long chain branches/1000 total carbons to about 1 long chain branches/1000 total carbons, more preferably from about 0.05 long chain branches/1000 total carbons to about 1 long chain branched/1000 total carbons, and especially from about 0.3 long chain branches/1000 total carbons to about 1 long chain branches/1000 total carbons.

As used herein, the term "backbone" refers to a discrete molecule, and the term "polymer" or "bulk polymer" refers in the conventional sense to the polmer as formed in a reactor. For the polymer to be a "substantially linear" polymer, the polymer must have at least enough molecules with long chain branching such that the average long chain branching in the bulk polymer is at least an average of about 0.01/1000 total carbons.

The term bulk polymer means the polymer which results from the polymerization process and, for the substantially linear polymers, includes molecules having both an absence of long chain branching, as well as molecules having long chain branching. Thus a bulk polymer includes all molecules formed during polymerization. It is understood that, for the substantially linear polymers, not all molecules have long chain branching, but a sufficient amount do such that the average long chain branching content of the bulk polymer positively affects the melt rheology (i.e., the melt fracture properties).

Long chain branching (LCB) is defined herein as a chain length of at least one (1) carbon less than the number of carbons in the comonomer, whereas short chain branching (SCB) is defined herein as a chain length of the same number of carbons in the residue of the comonomer after it is incorporated into the polymer molecule backbone. For example, an ethylene/1-octene substantially linear polymer has backbones with long chain branches of at least seven (7) carbons in length, but it also has short chain branches of only six (6) carbons in length.

Long chain branching can be distinguished from short chain branching by using $^{13}C$ nuclear magnetic resonance (NMR) spectroscopy and to a limited extent, e.g. for ethylene homopolymers, it can be quantified using the method of Randall (*Rev. Macromol. Chem. Physl.*, C29 (2&3), p. 285–297), the disclosure of which is incorporated herein by reference. However as a practical matter, current $^{13}C$ nuclear magnetic resonance spectroscopy cannot determine the length of a long chain branch in excess of about six (6) carbon atoms and as such, this analytical technique cannot distinguish between a seven (7) carbon branch and a seventy (70) carbon branch. The long chain branch can be as long as about the same length as the length of the polymer backbone.

U.S. Pat. No. 4,500,648, incorporated herein by reference, teaches that long chain branching frequeny (LCB) can be represented by the equation $LCB=b/M_w$ wherein b is the weight average number of long chain branches per molecule and $M_w$ is the weight average molecular weight. The molecular weight averages and the long chain branching characteristics are determined by gel permeation chromatography and intrinsic viscosity methods.

Similar to the traditional homogeneous polymers, the substantially linear ethylene/alpha-olefin copolymers of the invention have only a single melting point, as opposed to traditional Ziegler polymerized heterogeneous linear ethylene/alpha-olefin copolymers which have two or more melting points (determined using differential scanning calorimetry (DSC)). Ethylene polymers of this invention are also characterized by a single DSC melting peak between –30 and 150 C. However, those polymers having a density of about 0.875 g/cm$^3$ to about 0.91 g/cm$^3$, the single melt peak may show, depending on equipment sensitivity, a "shoulder" or a "hump" on the low side of the melting peak (i.e. below the melting point) that constitutes less than 12 percent, typically, less than 9 percent, more typically less than 6 percent of the total heat of fusion of the polymer. This artifact is due to intrapolymer chain variations, and it is discerned on the basis of the slope of the single melting peak varying montonically through the melting region of the artifacl Such artifact occurs within 34 C., typically within 27 C., and more typically within 20 C. of the melting point of the single melting peak. The single melting peak is determined using a differential scanning calorimeter standardized with indium and deionized water. The method involves about 5–7 mg sample sizes, a "first heat" to about 150 C. which is held for 4 minutes, a cool down at 10/min. to –30 C. which is held for 3 minutes, and heat up at 10 C/min. to 150 C. for the "second heat" heat flow vs. temperature curve. Total heat of fusion of the polymer is calculated from the area under the curve. The heat of fusion attributable to this artifact, if present, can be determined using an analytical balance and weight-percent calculations.

Figure 8:
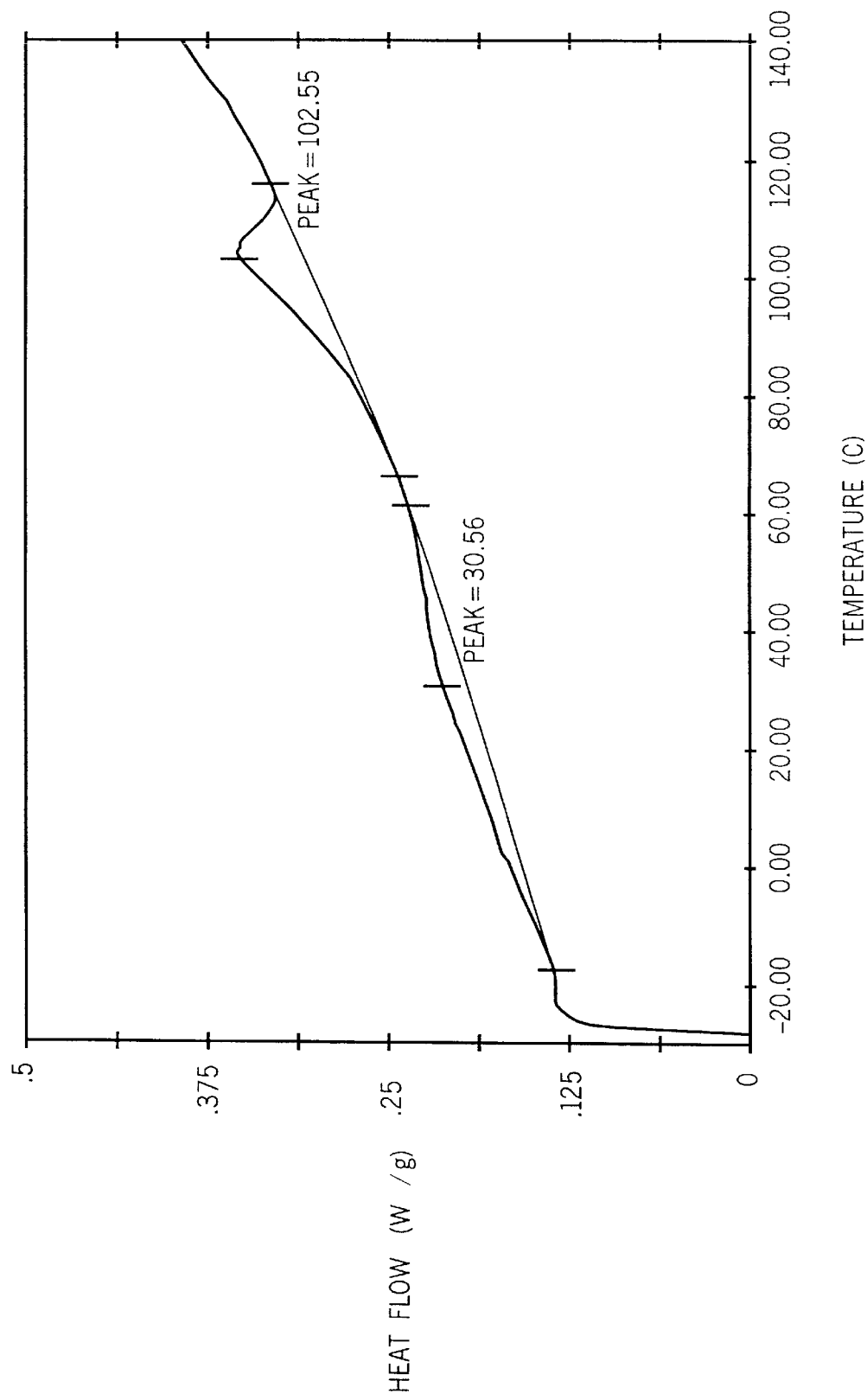
FIG. 8 graphically displays the melting curves for a comparative polymer made according to U.S. Pat. No. 5,218,071 (Mitsui).

FIG. 8 displays the melting curves for a polymer of the invention and for a comparative polymer as described in U.S. Pat. No. 5,218,071 (Mitsui). Note that the comparative polymer has two melting peaks (the high melting peak with a shoulder on its high side, i.e. above the second melting point), and this is indicative of the presence of two distinct polymers (as opposed to the melting curve of the invention polymer having only a single melting peak).

The SCBDI (Short Chain Branch Distribution Index) or CDBI (Composition Distribution Branch Index) is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, in Wild et al, *Journal of Polymer Science, Poly. Phys. Ed.*, Vol. 20, p. 441 (1982), or as described in U.S. Pat. No. 4,798,081. The SCBDI or CDBI for the substantially linear ethylene polymers of the present invention is typically greater than about 30 percent, preferably greater than about 50 percent, more preferably greater than about 80 percent, and most preferably greater than about 90 percent.

"Melt tension" is measured by a specially designed pulley transducer in conjunction with the melt indexer. Melt tension is the load that the extrudate or filament exerts while passing over the pulley onto a two inch drum that is rotating at the standard speed of 30 rpm. The melt tension measurement is similar to the "Melt Tension Tester" made by Toyoseiki and is described by John Dealy in "Rheometers for Molten Plastics", published by Van Nostrand Reinhold Co. (1982) on page 250–251. The melt tension of these new polymers is also surprisingly good, e.g., as high as about 2 grams or more. For the novel substantially linear ethylene interpolymers of this invention, especially those having a very narrow molecular weight distribution (i.e., $M_w/M_n$ from 1.5 to 2.5), the melt tension is typically at least about 5 percent, and can be as much as about 60 percent, greater than the melt tension of a conventional linear ethylene interpolymer having a melt index, polydispersity and density each within ten percent of the substantially linear ethylene polymer.

A unique characteristic of the presently claimed polymers is a highly unexpected flow property where the $I_{10}/I_2$ value is essentially independent of polydispersity index (i.e. $M_w/M_n$). This is contrasted with conventional Ziegler polymerized heterogeneous polyethylene resins and with conventional single site catalyst polymerized homogeneous polyethylene resins having rheological properties such that as the polydispersity index increases, the $I_{10}/I_2$ value also increases.

The density of the neat ethylene or substantially linear ethylene polymers of this invention, Le. polymers without inorganic fillers and not containing in excess of 20 ppm aluminum from catalyst residue, is measured in accordance with ASTM D-792. The ethylene or substantially linear ethylene polymers are crystalline and/or semi-crystalline polymers, are normally solid at room temperature, and are pelletizable at ambient conditions or at temperatures induced by cooled water. For example, a novel substantially linear ethylene/1-octene copolymer having a density of 0.865 g/cm$^3$ has about 10% crystallinity at room temperature. The minimum density is typically at least about 0.865 g/cm$^3$, preferably at least about 0.870 g/cm$^3$, and more preferably at least about 0.900 g/cm$^3$. The maximum density typically does not exceed about 0.970 g/cm$^3$, preferably it does not exceed about 0.940 g/cm$^3$, and more preferably it does not exceed about 0.92 g/cm$^3$.

The molecular weight of the ethylene or ethylene/alpha-olefin substantially linear ethylene polymers in the present invention is conveniently indicated using a melt index measurement according to ASTM D-1238, Condition 190 C/2.16 kg (formally known as "Condition (E)" and also known as $I_2$). Melt index is inversely proportional to the molecular weight of the polymer. Thus, the higher the molecular weight, the lower the melt index, although the relationship is not linear. The melt index for the ethylene or ethylene/alpha-olefin substantially linear ethylene polymers used herein is generally from about 0.01 grams/10 minutes (g/10 min) to about 1000 g/10 min, preferably from about 0.01 g/10 min to about 100 g/10 min, and especially from about 0.01 g/10 min to about 10 g/10 min.

Another measurement useful in characterizing the molecular weight of the substantially linear ethylene polymers is conveniently indicated using a melt index measurement according to ASTM D-1238, Condition 190C/10 kg (formally known as "Condition (N)" and also known as $I_{10}$). The ratio of these two melt index terms is the melt flow ratio and is designated as $I_{10}/I_2$. For the substantially linear ethylene/alpha-olefin polymers of the invention, the $I_{10}/I_2$ ratio indicates the degree of long chain branching, ie., the higher the $I_{10}/I_2$ ratio, the more long chain branching in the polymer. Generally, the $I_{10}/I_2$ ratio of the substantially linear ethylene/'-olefin polymers is at least about 5.63, preferably at least about 7, especially at least about 8, most especially at least about 9 or above. The only limitations on the maximum $I_{10}/I_2$ ratio are practical considerations such as economics, polymerization kinetics, etc., but typically the maximum $I_{10}/I_2$ ratio does not exceed about 20, and preferably it does not exceed about 15.

Antioxidants (e.g., hindered phenolics (e.g., Irganox® 1010 made by Ciba Geigy Corp.), phosphites (e.g., Irgafos® 168 made by Ciba Geigy Corp.)), are preferably added to protect the polymer from degradation during thermal processing steps such as pelletization, molding, extrusion, and characterization methods. Other additives to serve special functional needs include cling additives, e.g. PIB, antiblocks, antislips, pigments, fillers. In-process additives, e.g. calcium stearate, water, etc., may also be used for other purposes such as for the deactivation of residual catalyst However, peroxide need not be added to the novel polymers in order for the polymers to exhibit an $I_{10}/I_2$ independent of the MWD and the melt fracture properties.

Molecular Weight Distribution Determination

The whole interpolymer product samples and the individual interpolymer samples are analyzed by gel permeation chromatography (GPC) on a Waters 150 C. high temperature chromatography unit equipped with three linear mixed porosity bed columns (available from Polymer Laboratories), operating at a system temperature of 140 C. The solvent is 1,2,4-trichlorobenzene, from which 0.3 percent by weight solutions of the samples are prepared for injection. The flow rate is 1.0 milliliters/minute and the injection size is 200 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science, Polymer Letters*, Vol. 6, (621) 1968) to derive the following equation:

$$M_{polyethylene} = a * (M_{polystyrene})^b.$$

In this equation, a=0.4316 and b=1.0 for polyethylene and polystyrene in 1,2,4-trichlorobenzene. Weight average molecular weight, $M_w$, is calculated in the usual manner according to the following formula: $M_w = \Sigma w_i * M_i$, where $w_i$ and $M_i$ are the weight fraction and molecular weight, respectively, of the $i^{th}$ fraction eluting from the GPC column.

The molecular weight distribution ($M_w/M_n$) for the substantially linear ethylene polymers of the invention is generally less than about 5, preferably from about 1.5 to about 2.5, and especially from about 1.7 to about 2.3.

Processing Index Determination

The "rheological processing index" (PI) is the apparent viscosity (in kpoise) of a polymer and is measured by a gas extrusion rheometer (GER). The GER is described by M. Shida, R. N. Shroff and L. V. Cancio in Polym. Eng. Sci., Vol. 17, no. 11, p. 770 (1977), and in "Rheometers for Molten Plastics" by John Dealy, published by Van Nostrand Reinhold Co. (1982) on page 97–99, the disclosures of both of which are incorporated in their entirety herein by reference. The processing index is measured al a temperature of 190 C., at nitrogen pressure of 2500 psig using a 0.0296 inch (752 micrometers) diameter (preferably 0.0143 inch diameter die for high flow polymers, e.g. 50–100 melt index or greater), 20:1 L/D die having an entrance angle of 180 degrees. The GER processing index is calculated in millipoise units from the following equation:

PI=2.15×10$^6$ dyne/cm$^2$/(1000×shear rate),
where: 2.15×10$^6$ dyne/cm$^2$ is the shear stress at 2500 psi, and the shear rate is the shear rate at the wall as represented by the following equation:
32 Q'/(60 sec/min)(0.745)(Diameter×2.54 cm/in)$^3$,
where:
Q' is the extrusion rate (gms/min),
0.745 is the melt density of polyethylene (gm/cm$^3$), and
Diameter is the orifice diameter of the capillary (inches).

The PI is the apparent viscosity of a material measured at apparent shear stress of 2.15×10$^6$ dyne/cm$^2$.

For the substantially linear ethylene polymers (or ethylene/alpha-olefin copolymers or interpolymers), the PI is less than or equal to 70 percent of that of a conventional linear ethylene polymer (or ethylene/alpha-olefin copolymer or interpolymer) having an $I_2$, $M_w/M_n$ and density each within ten percent of the substantially linear ethylene polymer.

An apparent sheer stress vs. apparent shear rate plot is used to identify the melt fracture phenomena over a range of nitrogen pressures from 5250 to 500 psig using the die or GER test apparatus previously described. According to Ramamurthy in *Journal of Rheology,* 30(2), 337–357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular gloss to the more severe form of "sharkskin". In this disclosure, the onset of surface melt fracture is characterized at the beginning of losing extrudate gloss at which the surface roughness of extrudate can only be detected by 40×magnification. The critical shear rate at onset of surface melt fracture for the substantially linear ethylene polymers is at least 50 percent greater than the critical shear rate at the onset of surface melt fracture of a linear ethylene polymer having about the same $I_2$ and $M_w/M_n$. Preferably, the critical shear stress at onset of surface melt fracture for the substantially linear ethylene polymers of the invention is greater than about $2.8 \times 10^6$ dyne/cm$^2$.

Gross melt fracture occurs at unsteady flow conditions and ranges in detail from regular (alternating rough and smooth, helical, etc.) to random distortions. For commercial acceptability, (e.g., in blown film products), surface defects should be minimal, if not absent The critical shear rate at onset of surface melt fracture (OSMF) and critical shear stress at onset of gross melt fracture (OGMF) will be used herein based on the changes of surface roughness and configurations of the extrudates extruded by a GER For the substantially linear ethylene polymers of the invention, the critical shear stress at onset of gross melt fracture is preferably greater than about $4 \times 10^6$ dyne/cm$^2$.

For the processing index determination and for the GER melt fracture determination, the novel ethylene or substantially linear ethylene copolymers are tested without inorganic fillers, and they do not have more than 20 ppm aluminum catalyst residue. Preferably, however, for the processing index and melt fracture tests, the novel ethylene polymers and substantially linear ethylene copolymers do contain antioxidants such as phenols, hindered phenols, phosphites or phosphonites, preferably a combination of a phenol or hindered phenol and a phosphite or a phosphonite.

The Constrained Geometry Catalyst

Suitable constrained geometry catalysts for use herein preferably include constrained geometry catalysts as disclosed in U.S. application Ser. Nos.: 545,403, filed Jul. 3, 1990; 758,654, filed Sep. 12, 1991 now U.S. Pat. No. 5,132,381; 758,660, filed Sep. 12, 1991, and 720,041, filed Jun. 24, 1991. The monocyclopentadienyl transition metal olefin polymerization catalysts taught in U.S. Pat. No. 5,026,798 which is incorporated herein by reference, are also believed to be suitable for use in preparing the polymers of the present invention, so long as the polymerization conditions substantially conform to those of the present invention.

The foregoing catalysts may be further described as comprising a metal coordination complex comprising a metal of groups 3–10 or the Lanthanide series of the Periodic Table of the Elements and a delocaized pi-bonded moiety substituted with a constrain-inducing moiety, said complex having a constrained geometry about the metal atom such that the angle at the metal between the centroid of the delocalized, substituted pi-bonded moiety and the center of at least one remaining substituent is less than such angle in a similar complex containing a similar pi-bonded moiety lacking in such constrain-inducing substituent, and provided further that for such complexes comprising more than one delocalized, substituted pi-bonded moiety, only one thereof for each metal atom of the complex is a cyclic, delocalized, substituted pi-bonded moiety. The catalyst further comprises an activating cocatalysl Preferred catalyst complexes correspond to the formula:

(I)

wherein:
M is a metal of group 3–10, or the Lanthanide series of the Periodic Table of the Elements;

Cp* is a cyclopentadienyl or substituted cyclopentadienyl group bound in an eta$^5$ bonding mode to M;

Z is a moiety comprising boron, or a member of group 14 of the Periodic Table of the Elements, and optionally sulfur or oxygen, said moiety having up to 20 non-hydrogen atoms, and optionally Cp* and Z together form a fused ring system;

X independently each occurrence is an anionic ligand group or neutral Lewis base ligand group having up to 30 non-hydrogen atoms;

n is 0, 1, 2, 3, or 4 and is 2 less than the valence of M; and

Y is an anionic or nonanionic ligand group bonded to Z and M comprising nitrogen, phosphorus, oxygen or sulfur and having up to 20 non-hydrogen atoms, optionally Y and Z together form a fused ring system.

More preferably still, such complexes correspond to the formula:

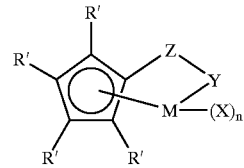

wherein:
R' each occurrence is independently selected from the group consisting of hydrogen, alkyl aryl silyl, germyl, cyano, halo and combinations thereof having up to 20 non-hydrogen atoms;

X each occurrence independently is selected from the group consisting of hydride, halo, alkyl, aryl, silyl, gernyl, aryloxy, alkoxy, amide, siloxy, neutral Lewis base ligands and combinations thereof having up to 20 non-hydrogen atoms;

Y is —O—, —S—, —NR*—, —PR*—, or a neutral two electron donor ligand selected from the group consisting of OR*, SR*, NR*$_2$ or PR*$_2$;

M is as previously defined; and

Z is SiR*$_2$, CR*$_2$, SiR*$_2$SiR*$_2$, CR*$_2$CR*$_2$, CR*=CR*, CR*$_2$SiR*$_2$, GeR*$_2$, BR*, BR*$_2$;

wherein

R* each occurrence is independently selected from the group consisting of hydrogen, alkyl, aryl, silyl, halogenated ailcyl, halogenated aryl groups having up to 20 non-hydrogen atoms, and mixtures thereof, or two or more R* groups from Y, Z, or both Y and Z form a fused ring system; and n is 1 or 2.

It should be noted that whereas formula I and the following formulas indicate a cyclic structure for the catalysts, when Y is a neutral two electron donor ligand, the bond between M and Y is more.accurately referred to as a coordinate-covalent bond. Also, it should be noted that the complex may exist as a dimer or higher oligomer.

Further preferably, at least one of R', Z, or R* is an electron donating moiety. Thus, highly preferably Y is a nitrogen or phosphorus containing group corresponding to the formula —N(R")— or —P(R")—, wherein R" is $C_{1-10}$ alkyl or aryl, i.e., an amido or phosphido group.

Most highly preferred complex compounds are amidosilane- or amidoalkanediyl-compounds corresponding to the formula:

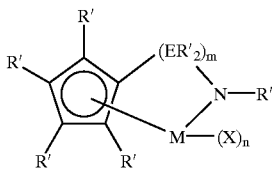

wherein:

M is titanium, zirconium or hafnium, bound in an $eta^5$ bonding mode to the cyclopentadienyl group;

R' each occurrence is independently selected from the group consisting of hydrogen, silyl, alkyl, aryl and combinations thereof having up to 10 carbon or silicon atoms;

E is silicon or carbon;

X independently each occurrence is hydride, halo, alkyl, aryl, aryloxy or alkoxy of up to 10 carbons;

m is 1 or 2; and n is 1 or 2.

Examples of the above most highly preferred metal coordination compounds include compounds wherein the R' on the amido group is methyl, ethyl, propyl, butyl, pentyl, hexyl, (including isomers), norbornyl, benzyl, phenyl, etc.; the cyclopentadienyl group is cyclopentadienyl, indenyl, tetrahydroindenyl, fluorenyl, octahydrofluorenyl, etc.; R' on the foregoing cyclopentadienyl groups each occurrence is hydrogen, methyl, ethyl, propyl, butyl, pentyl hexyl, (including isomers), norbornyl benzyl phenyl etc.; and X is chloro, bromo, iodo, methyl ethyl, propyl, butyl, pentyl, hexyl, (including isomers), norbornyl, benzyl, phenyl, etc. Specific compounds include: (tert-butylamido)(tetramethyl-$eta^5$-cyclopentadienyl)-1,2-ethanediylzirconium dichloride, (tert-butylarnido)(tetramethyl-$eta^5$yclopentadienyl)-1,2-ethanediyltitanium dichloride, (methylamido)(tetramethyl-$eta^5$-cyclopentadienyl)-1,2-ethanediyzirconium dichloride, (methylamido)(tetramethyl-$eta^5$-cyclopentadienyl)-1,2-ethanediyltitanium dichloride, (ethylamido)(tetramethyl-$eta^5$-cyclopentadienyl)-methylenetitanium dichloro, (tertbutylamido)dibenzyl(termethyl-$eta^5$-cyclopentadienyl)silanezirconium dibenzyl, (benzylamido)dimethyl-(tetuamelhyl-eta5-cyclopentadienyl)silaneutanium dichloride, (phenylphosphido)dimethyl(tetramethyl-$eta^5$-cyclopentadienyl)silanezirconiuum dibenzyl, (tertbutylarnido)dimethyl(tetramethyl-$eta^5$-cyclopentadienyl)silanetitanium dimethyl, and the like.

The complexes may be prepared by contacting a derivative of a metal, M, and a group I metal derivative or Grignard derivative of the cyclopentadienyl compound in a solvent and separating the salt byproduct Suitable solvents for use in preparing the metal complexes are aliphatic or aromatic liquids such as cyclohexane, methylcyclohexane, pentane, hexane, heptane, tetrahydrofuran, diethyl ether, benzene, toluene, xylene, ethylbenzene, etc., or mixtures thereof.

In a preferred embodiment, the metal compound is $MX_{n+1}$, i.e., M is in a lower oxidation state than in the corresponding compound, $MX_{n+2}$ and the oxidation state of M in the desired final complex. A noninterfering oxidizing agent may thereafter be employed to raise the oxidation state of the metal The oxidation is accomplished merely by contacting the reactants utilizing solvents and reaction conditions used in the preparation of the complex itself. By the term "noninterfering oxidizing agent" is meant a compound having an oxidation potential sufficient to raise the metal oxidation state without interfering with the desired complex a formation or subsequent polymerization processes. A particularly suitable noninterfering oxidizing agent is AgCl or an organic halide such as methylene chloride. The foregoing techniques are disclosed in U.S. Ser. No. 545,403, filed Jul. 3, 1990 and 702,475, filed May 20, 1991, the teachings of both of which are incorporated herein by reference.

Additionally the complexes may be prepared according to the teachings of the copending U.S. application Ser. No. 778,433 entitled: "Preparation of Metal Coordination Complex (I)", filed in the names of Peter Nickias and David Wilson, on Oct. 15, 1991 and the copending U.S. application Ser. No. 778,432 entitled: "Preparation of Metal Coordination Complex (II)", filed in the names of Peter Nickias and David Devore, on Oct. 15, 1991, and the patents issuing therefrom, all of which are incorporated herein by reference.

Suitable cocatalysts for use herein include polymeric or oligomeric aluminoxanes, especially methyl aluminoxane, as well as inert, compatible, noncoordinating, ion forming compounds. So called modified methyl aluminoxane (MMAO) is also suitable for use as a cocatalysl One technique for preparing such modified aluminoxane is disclosed in U.S. Pat. No. 5,041,584. Aluminoxanes can also be made as disclosed in U.S. Pat. Nos. 5,218,071; 5,086,024, 5,041,585, 5,041,583, 5,015,749, 4,960,878 and 4,544,762 all of which are incorporated herein by reference. Aluminoxanes, including modified methyl aluminoxanes, when used in the polymerization, are preferably used such that preferably less than about 20 ppm aluminum, especially less than about 10 ppm aluminum, and more preferably less than about 5 ppm alumninum, from catalyst residue remain in the polymer. In order to measure the bulk polymer properties (e.g. PI or melt fracture), aqueous HCl is used to extract the aluminoxane from the polymer. Preferred cocatalysts, however, are inert, noncoordinatina, boron compounds such as those described in EP 520732 which is incorporated herein by reference.

Ionic active catalyst species which can be used to polymerize the polymers described herein correspond to the formula:

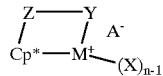

wherein:

M is a metal of group 3–10, or the Lanthanide series of the Periodic Table of the Elements;

Cp* is a cyclopentadienyl or substituted cyclopentadienyl group bound in an $eta^5$ bonding mode to M;

Z is a moiety comprising boron, or a member of group 14 of the Periodic Table of the Elements, and optionally sulfur or oxygen, said moiety having up to 20 non-hydrogen atoms, and optionally Cp* and Z together form a fused ring system;

X independently each occurrence is an anionic ligand group or neutral Lewis base ligand group having up to 30 non-hydrogen atoms;

n is 0, 1, 2, 3, or 4 and is 2 less than the valence of M; and

A— is a noncoordinating, compatible anion.

One method of making the ionic catalyst species which can be utilized to make the polymers of the present invention involve combining:

a) at least one first component which is a mono (cyclopentadienyl) derivative of a metal of Group 3–10 or the Lanthanide Series of the Periodic Table of the Elements containing at least one substituent which will combine with the cation of a second component (described hereinafter) which first component is capable of forming a cation formally having a coordination number that is one less than its valence, and b) at least one second component which is a salt of a Bronsted acid and a noncoordinating, compatible anion.

More particularly, the nonordinating, compatible anion of the Bronsted acid salt may comprise a single coordination complex comprising a charge-bearing metal or metalloid core, which anion is both bulky and non-nucleophilic. The recitation "metalloid", as used herein, includes non-metals such as boron, phosphorus and the like which exhibit semi-metallic characteristics.

Illustrative, but not limiting examples of monocyclopentadienyl metal components (first components) which may be used in the preparation of cationic complexes are derivatives of titanium, zirconium, vanadium, hafnium, chromium, lanthanum, etc. Preferred components are titanium or zirconium compounds. Examples of suitable monocyclopentadienyl metal compounds are hydrocarbyl-substituted monocyclopentadienyl metal compounds such as (tert-butylamido)(tetramethyl-eta$^5$-cyclopentadienyl)-1,2-ethanediylzirconium dimethyl, (tert-butylamido)(tetramethyl-eta$^5$-cyclopentadienyl)-1,2-ethanediyltitanium dimethyl, (methylamido)(tetramethyl-eta$^5$-cyclopentadienyl)-1,2-ethanediylzirconium dibenzyl, (methylamido)(tetramethyl-eta$^5$-cyclopentadienyl)-1,2-ethanediyltitanium dimethyl, (ethylamido)(tetramethyl-eta$^5$-cyclopentadienyl)methylenetitanium dimethyl, (tertbutylamido)dibenzyl(tetramethyl-eta$^5$-cyclopentadienyl)silanezirconium dibenzyl, (benzylamido)dimethyl-(tetramethyl-eta$^5$ cyclopentadienyl)silanetitanium diphenyl, (phenylphosphido)dithyl(tetramethyl-O$^5$-cyclopentadienyl)silanezirconium dibenzyl, and the like.

Such components are readily prepared by combining the corresponding metal chloride with a dilithium salt of the substituted cyclopentadienyl group such as a cyclopentadienyl-alanediyl, cyclopentadienyl-silane amide, or cyclopentadienyl-phosphide compound. The reaction is conducted in an inert liquid such as tetrahydrofuran, C$_{5-10}$ alkanes, toluene, etc. utilizing conventional synthetic procedures. Additionally, the first components may be prepared by reaction of a group II derivative of the cyclopentadienyl compound in a solvent and separating the salt by-product Magnesium derivatives of the cyclopentadienyl compounds are preferred. The reaction may be conducted in an inert solvent such as cyclohexane, pentane, tetrahydrofuran, diethyl ether, benzene, toluene, or mixtures of the like. The resulting metal cyclopentadienyl halide complexes may be alkylated using a variety of techniques. Generally, the metal cyclopentadienyl alkyl or aryl complexes may be prepared by alkylation of the metal cyclopentadienyl halide complexes with alkyl or aryl derivatives of group I or group II metals. Preferred alkylating agents are alkyl lithium and Grignard derivatives using conventional synthetic techniques. The reaction may be conducted in an inert solvent such as cyclohexane, pentane, tetrahydrofuran, diethyl ether, benzene, toluene, or mixtures of the like. A preferred solvent is a mixture of toluene and tetrahydrofuran.

Compounds useful as a second component in the preparation of the ionic catalysts useful in this invention will comprise a cation, which is a Bronsted acid capable of donating a proton, and a compatible noncoordinating anion. Preferred anions are those containing a single coordination complex comprising a charge-bearing metal or metalloid core which anion is relatively large (bulky), capable of stabilizing the active catalyst species (the Group 3–10 or Lanthanide Series cation) which is formed when the two components are combined and suffciently labile to be displaced by olefinic, diolefinic and acetylenically unsaturated substrates or other neutral Lewis bases such as ethers, nitriles and the like. Suitable metals, then, include, but are not limited to, aluminum, gold, platinum and the like. Suitable metalloids include, but are not limited to, boron, phosphorus, silicon and the like. Compounds containing anions which comprise coordination complexes containing a single metal or metalloid atom are, of course, well known and many, particularly such compounds containing a single boron atom in the anion portion, are available commercially. In light of this, salts containing anions comprising a coordination complex containing a single boron atom are preferred.

Highly preferably, the second component useful in the preparation of the catalysts of this invention may be represented by the following general formula:

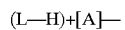

wherein:

L is a neutral Lewis base;

(L—H)+is a Bronsted acid; and

[A]— is a compatible, noncoordinating anion.

More preferably [A]— corresponds to the formula:

wherein:

M' is a metal or metalloid selected from Groups 5–15 of the Periodic Table of the Elements; and Q independently each occurrence is selected from the Group consisting of hydride, dialkylamido, halide, alkoxide, aryloxide, hydrocarbyl, and substituled-hydrocarbyl radicals of up to 20 carbons with the proviso that in not more than one occurrence is Q halide and q is one more than the valence of M'.

Second components comprising boron which are particularly useful in the preparation of catalysts of this invention may be represented by the following general formula:

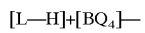

wherein:

L is a neutral Lewis base;

[L—H]+ is a Bronsted acid;

B is boron in a valence state of 3; and

Q is as previously defined.

Illustrative, but not limiting, examples of boron compounds which may be used as a second component in the preparation of the improved catalysts of this invention are trialkyl-substituted ammonium salts such as triethylammonium tetraphenylborate, tripropylammonium tetraphenylborate, tris(n-butyl)ammonium tetraphenylborate, trimethylammonium tetrakis(p-tolyl) borate, tributylammonium tetrakis(pentafluorophenyl) borate, tripropylamnmonium tetrakis(2,4-dimethylphenyl) borate, tributylammonium tetrakis(3,5-dimethylphenyl) borate, triethylammonium tetrakis(3,5di-trifluoromethylphenyl)borate and the like. Also suitable are N,N-dialkyl anilinium salts such as N,N-dimethyl-aniliniumtetraphenylborate, N,N-diethylaniiium tetraphenylborate, N,N-2,4,6-pentamethylanilinium tetraphenylborate and the like; diallylammonium salts such as di-(i-propyl)ammonium tetrakis(pentafluorophenyl)borate, dicyclohexylammonium tetraphenylborate and the like; and triaryl phosphonium salts such as triphenylphosphonium tetraphenylborale, tri(methylphenyl)phosphonium tetrakis-pentafluorophenylborate, tri(dimethylphenyl)phosphonium tetraphenylborate and the like.

Preferred ionic catalysts are those having a limiting charge separated structure corresponding to the formula:

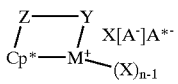

wherein:

M is a metal of group 3–10, or the Lanthanide series of the Periodic Table of the Elements;

Cp* is a cyclopentadienyl or substituted cyclopentadienyl group bound in an eta$^5$ bonding mode to M;

Z is a moiety comprising boron, or a member of group 14 of the Periodic Table of the Elements, and optionally sulfur or oxygen, said moiety having up to 20 non-hydrogen atoms, and optionally Cp* and Z together form a fused ring system;

X independently each occurrence is an anionic ligand group or neutral Lewis base ligand group having up to 30 non-hydrogen atoms;

n is 0, 1, 2, 3, or 4 and is 2 less than the valence of M; and

XA*— is —XB($C_6F_5$)$_3$.

This class of cationic complexes may be conveniently prepared by contacting a metal compound corresponding to the formula;

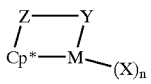

wherein:

Cp*, M, and n are as previously defined, with tris (pentafluorophenyl)borane cocatalyst under conditions to cause abstraction of X and formation of the anion —XB($C_6F_5$)$_3$.

Preferably X in the foregoing ionic catalyst is $C_1$–$C_{10}$ hydrocarbyl, most preferably methyl.

The preceding formula is referred to as the limiting, charge separated structure. However, it is to be understood that, particularly in solid form, the catalyst may not be fully charge separated. That is, the X group may retain a partial covalent bond to the metal atom, M. Thus, the catalysts may be alternately depicted as possessing the formula:

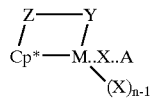

The catalysts are preferably prepared by contacting the derivative of a Group 4 or Lanthanide metal with the tris(pentafluorophenyl)borane in an inert diluent such as an organic liquid.

Tris(pentafluorphenyl)borane is a commonly available Lewis acid that may be readily prepared according to known techniques. The compound is disclosed in Marks, et al. *J. Am. Chem. Soc.* 1991, 113, 3623–3625 for use in alkyl abstraction of zirconocenes.

All reference to the Periodic Table of the Elements herein shall refer to the Periodic Table of the Elements, published and copyrighted by CRC Press, Inc., 1989. Also, any reference to a Group or Groups shall be to the Group or Groups as reflected in this Periodic Table of the Elements using the IUPAC system for numbering groups.

It is believed that in the constrained geometry catalysts used herein the metal atom is forced to greater exposure of the active metal site because one or more substituents on the single cyclopentadienyl or substituted metal is both bonded to an adjacent covalent moiety and held in association with the cyclopentadienyl group through an eta$^5$ or other pi-bonding interaction. It is understood that each respective bond between the metal atom and the constituent atoms of the cyclopentadienyl or substituted cyclopentadienyl group need not be equivalent. That is, the metal may be symmetrically or unsymmetrically pi-bound to the cyclopentadienyl or substituted cyclopentadienyl group.

The geometry of the active metal site is further defined as follows. The centroid of the cyclopentadienyl or substituted cyclopentadienyl group may be defined as the average of the respective X, Y, and Z coordinates of the atomic centers forming the cyclopentadienyl or substituted cyclopentadienyl group. The angle, theta, formed at the metal center between the centroid of the cyclopentadienyl or substituted cyclopentadienyl group and each other ligand of the metal complex may be easily calculated by standard techniques of single crystal X-ray diffraction Each of these angles may increase or decrease depending on the molecular structure of the constrained geometry metal complex. Those complexes wherein one or more of the angles, theta, is less than in a similar, comparative complex differing only in the fact that the constrain inducing substituent is replaced by hydrogen, have constrained geometry for purposes of the present invention Preferably one or more of the above angles, theta, decrease by at least 5 percent, more preferably 7.5 percent, compared to the comparative complex. Highly preferably, the average value of all bond angles, theta, is also less than in the comparative complex.

Preferably, monocyclopentadienyl metal coordination complexes of group 4 or lanthanide metals according to the present invention have constrained geometry such that the smallest angle, theta, between the centroid of the Cp* group and the Y substituent, is less than 115 degrees, more preferably less than 110 degrees, most preferably less than 105 degrees, and especially less than 100 degrees.

Other compounds which are useful in the catalyst compositions of this invention, especially compounds containing other Group 4 or Lanthanide metals, will, of course, be apparent to those skilled in the art.

Polymerization

The improved melt elasticity and processibility of the substantially linear polymers according to the present invention result, it is believed, from their method of production. The polymers may be produced via a continuous (as opposed to a batch) controlled polymerization process using at least one reactor (e.g., as disclosed in WO 93/07187, WO 93/07188, and WO 93/07189, the disclosures of each of which is incorporated herein by reference), but can also be produced using multiple reactors (e.g., using a multiple reactor configuration as described in U.S. Pat. No. 3,914,342, the disclosure of which is incorporated herein by reference) at a polymerization temperature and pressure sufficient to produce the interpolymers having the desired properties.

While not wishing to be bound by any particular theory, the inventors believe that long chain branches are formed in their novel polymers according to the following sequence:

Propagation Step

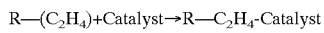
R—(C$_2$H$_4$)+Catalyst→R—C$_2$H$_4$-Catalyst

Termination Step

R—C$_2$H$_4$-Catalyst→R—CH=CH$_2$ (beta-hydride elimination)

Copolymerization

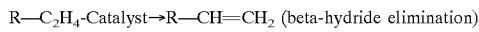
R—CH$_2$—CH$_2$—CHR'—CH$_2$-Catalyst→R—CH$_2$—CH$_2$—CHR'—CH$_2$-Catalyst Continued Polymerization

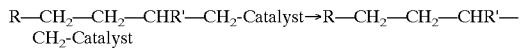
R—CH$_2$—CH$_2$—CHR'—CH$_2$-Catalyst+(C$_2$H$_4$)$_x$→R—CHR'(CH$_2$CH$_2$)$_x$-Catalyst Termination Step 1) R—CHR'(CH$_2$CH$_2$)$_x$-Catalyst+Heat→R—CHR'R"CH=CH$_2$+H-Catalyst
2) R—CHR'(CH$_2$CH$_2$)$_x$-Catalyst+H$_2$→R—CHR'R"+H-Catalyst wherein:
R=growing polymer chain
R'=long chain branch (LCB), and
R"=growing polymer chain after insertion of R".

In polymerizing ethylene and ethylene/alpha-olefin copolymers, a batch reactor process typically operates at an ethylene concentration from about 6.7 to about 12.5 percent by weight of the reactor contents and have a polymer concentration generally less than about 5 percent by weight of the reactor contents, dependent upon the ethylene solubility, which is a function of reactor diluent, temperature and pressure. Ile initital polymer concentration is zero and increases over time as the reaction proceeds such that the highest polymer concentration occurs at the end of the reaction, the point at which the catalyst is spent. Most of the polymer is made during the initial minutes of the polymerization.

According to one embodiment of the present process, the polymers are produced in a continuous process operated at a steady state (i.e. the reactants are fed to the reactor at a rate in substantially in balance with the rate that product is removed from the reactor such that the reaction mass in the reactor is relatively constant in volume and composition), as opposed to a batch process. Preferably, the polymerization temperature of the continuous process is from about 20 C. to about 250 C., using constrained geometry catalyst technology. If a narrow molecular weight distribution polymer ($M_w/M_n$ of from about 1.5 to about 2.5) having a higher $I_{10}/I_2$ ratio (e.g. $I_{10}/I_2$ of 7 or more, preferably at least 8, especially at least 9 and as high as about 20 or more) is desired, the ethylene concentration in the reactor is preferably not more than about 8 percent by weight of the reactor contents, especially not more than about 6 percent by weight of the reactor contents, and most especially not more than about 4 percent by weight of the reactor contents, and as low as about 0.75 percent by weight of the reactor contents. Preferably, the polymerization is performed in a solution polymerization process. Generally, manipulation of $I_{10}/I_2$ while holding $M_w/M_n$ relatively low for producing the novel polymers described herein is a function of reactor temperature and/or ethylene concentration. Surprisingly, reduced ethylene concentration and higher temperature generally produces higher $I_{10}/I_2$. Generally, as the percent of ethylene is converted into polymer, the ethylene concentration in the reactor decreases and the polymer concentration increases. For the novel substantially linear ethylene/alpha-olefin copolymers and substantially linear ethylene homopolymers claimed herein, the polymer concentration for a continuous solution polymerization process is preferably above about 5 weight percent of the reactor contents, especially above about 15 weight percent of the reactor contents, and as high as about 40 weight percent of the reactor contents. Typically greater than 70 percent, preferably greater than 80 percent and more preferably greater than 90 percent, of the ethylene is converted to polymer.

The substantially linear polymers of the present invention can be ethylene homopolymers, or they can be interpolymers of ethylene with at least one $C_3$–$C_{20}$ alpha-olefin and/or $C_4$–$C_{18}$, diolefins. The substantially linear polymers of the present invention can also be interpolymers of ethylene with at least one of the above $C_3$–$C_{20}$ alpha-olefins and/or diolefins in combination with other unsaturated monomers.

Monomers usefully copolymerized or interpolymerized with ethylene according to the present invention include, for example, ethylenically unsaturated monomers, conjugated or nonconjugated dienes, polyenes, etc. Preferred comonomers include the $C_3$–$C_{10}$ alpha-olefins especially propene, isobutylene, 1-butene, 1-hexene, 4-methyl-1-pentene, and 1-octene. Other preferred monomers include styrene, halo- or alkyl substituted styrenes, vinylbenzocyclobutene, 1,4-hexadiene, and naphthenics (e.g., cyclo-pentene, cyclo-hexene and cyclo-octene).

Other unsaturated monomers usefully copolymerized according to the present invention include, for example, ethylenically unsaturated monomers, conjugated or nonconjugated dienes, polyenes, etc. Preferred comonomers include the $C_3$–$C_{10}$ alpha-olefins especially propene, isobutylene, 1-butene, 1-hexene, 4methyl-1-pentene, and 1-octene. Other preferred comonomers include styrene, halo- or alkyl substituted styrenes, vinylbenzocyclobutene, 1,4-hexadiene, and naphthenics (e.g., cyclopentene, cyclohexene and cyclooctene).

The polymerization conditions for manufacturing the polymers of the present invention are generally those useful in the solution polymerization process, although the application of the present invention is not limited thereto. Slurry and gas phase polymerization processes are also believed to be useful, provided the proper catalysts and polymerization conditions are employed.

Multiple reactor polymerization processes are also useful in the present invention, such as those disclosed in U.S. Pat. No. 3,914,342. The multiple reactors can be operated in series or in parallel, with at least one constrained geometry catalyst employed in at least one of the reactors.

In general, the continuous polymerization according to the present invention may be accomplished at conditions well known in the prior art for Ziegler-Natta or Kaminsky-Sinn type polymerization reactions, that is, temperatures from 0 to 250 C. and pressures from atmospheric to 1000 atmospheres (100 MPa). Suspension, solution, slurry, gas phase or other process conditions may be employed if desired. A support may be employed, but preferably the catalysts are used in a homogeneous (i.e., soluble) manner. It will, of course, be appreciated that the active catalyst system form in situ if the catalyst and the cocatalyst components thereof are added directly to the polymerization process and a suitable solvent or diluent, including condensed monomer, is used in said polymerization process. It is, however, preferred to form the active catalyst in a separate step in a suitable solvent prior to adding the same to the polymerization mixture.

The polymerization conditions for manufacturing the polymers of the present invention are generally those useful in the solution polymerization process, although the application of the present invention is not limited thereto. Gas phase polymerization processes are also believed to be useful, provided the proper catalysts and polymerization conditions are employed.

Fabricated articles made from the novel ethylene polymers may be prepared using all of the conventional polyethylene processing techniques. Useful articles include films (e.g., cast, blown and extrusion coated), fibers (e.g., staple fibers (including use of a novel ethylene polymer disclosed herein as at least one component comprising at least a portion of the fiber's surface), spunbond fibers or melt blown fibers (using, e.g., systems as disclosed in U.S. Pat. Nos. 4,340,563, 4,663,220, 4,668,566, or 4,322,027), and gel spun fibers (e.g., the system disclosed in U.S. Pat. No. 4,413,110)), both woven and nonwoven fabrics (e.g., spunlaced fabrics disclosed in U.S. Pat. No. 3,485,706) or structures made from such fibers (including, e.g., blends of these fibers with other fibers, e.g., PET or cotton) and molded articles (e.g., made using an injection molding process, a blow molding process or a rotomolding process). The new polymers described herein are also useful for wire and cable coating operations, impact modification, especially at low temperatures, of thermoplastic olefins (e.g., polypropylene), as well as in sheet extrusion for vacuum forming operations, closed cell and open cell foams (including radiation and chemically crosslinked foams and foam structures), and adhesives. All of the preceding patents are incorporated herein by reference.

Useful compositions are also suitably prepared comprising the substantially linear polymers of the present invention and at least one other natural or synthetic polymer. Preferred other polymers include thermoplastics such as styrene-butadiene block copolymers, polystyrene (including high impact polystyrene), ethylene vinyl acetate copolymers, ethylene acrylic acid copolymers, other olefin copolymers (especially polyethylene copolymers) and homopolymers (e.g., those polyethylene copolymers and homopolymers made using conventional heterogeneous catalysts). Examples of such heterogeneous polyethylene polymers and copolymers include polymers made by the process of U.S. Pat. No. 4,076,698 (incorporated herein by reference), other linear or substantially linear polymers of the present invention, and mixtures thereof. Other substantially linear polymers of the present invention and conventional heterogeneously branched HDPE and/or heterogeneously branched LLDPE are preferred for use in the thermoplastic compositions.

The compositions comprising the substantially linear ethylene polymers are formed by any convenient method, including dry blending the individual components and subsequently melt mixing, either directly in the extruder used to make the finished article (e.g., film), or by pre-melt mixing in a separate extruder. The polyethylene compositions may also be prepared by multiple reactor polymerization techniques. For example, one reactor may polymerize the constrained geometry catalyzed polyethylene and another reactor polymerize the heterogeneous catalyzed polyethylene, either in series or in parallel operation.

Compositions comprising the ethylene polymers can also be formed into fabricated articles such as those previously mentioned using conventional polyethylene processing techniques which are well known to those skilled in the art of polyethylene processing.

For examples described herein, unless otherwise stipulated, all procedures were performed under an inert atmosphere of nitrogen or argon. Solvent choices were often optional, for example, in most cases either pentane or 30–60 petroleum ether can be interchanged. Amines, silanes, lithium reagents, and Grignard reagents were purchased from Aldrich Chemical Company. Published methods for preparing tetranethylcyclopentadiene ($C_5Me_4H_2$) and lithium tetramethylcyclopentadienide ($Li(C_5Me_4H)$) include C. M. Fendrick et al. *Organometallcs*, 3, 819 ( 1984). Lithiated substituted cyclopentadienyl compounds may be typically prepared from the corresponding cyclopentadiene and a lithium reagent such as n-butyl lithium. Titanium trichloride ($TiCl_3$) was purchased from Aldrich Chemical Company. The tetrahydrofuran adduct of titanium trichloride, $TiCl_3(THF)_3$, was prepared by refluxing $TiCl_3$ in THF overnight, cooling, and isolating the blue solid product, according to the procedure of L. E. Manzer, *Inorg. Syn.*, 21, 135 (1982).

EXAMPLE 1–4

The metal complex solution for Example I is prepared as follows:

Part 1: Prep of $Li(C_5Me_4H)$

In the dryhox, a 3L 3-necked flask was charged with 18.34 g of $C_5Me_4H_2$, 800 mL of pentane, and 500 mL of ether. The flask was topped with a reflux condenser, a mechanical stirrer, and a constant addition funnel container 63 mL of 2.5 M n-BuLi in hexane. The BuLi was added dropwise over several hours. A very thick precipitate formed; approx. 1000 mL of additional pentane had to be added over the course of the reaction to allow stirring to continue. After the addition was complete, the mixture was stirred overnight. The next day, the material was filtered, and the solid was thoroughly washed with pentane and then dried under reduced pressure. 14.89 g of $Li(C_5Me_4H)$ was obtained (78 percent).

Part 2: Prep of $C_5Me_4HSiMe_2Cl$

In the drybox 30.0 g of $L(iC_5Me_4H)$ was placed in a 500 mL Schlenk flask with 250 mL of THF and a large magnetic stir bar. A syringe was charged with 30 mL of $Me2SiCl_2$ and the flask and syringe were removed from the drybox. On the Schlenk line under a flow of argon, the flask was cooled to −78 C., and the $Me_2SiCl_2$ added in one rapid addition. The reaction was allowed to slowly warm to room temperature and stirred overnight. The next morning the volatile materials were removed under reduced pressure, and the flask was taken into the drybox. The oily material was extracted with pentane, filtered, and the pentane was removed under reduced pressure to leave the $C_5Me_4HSiMe_2Cl$ as a clear yellow liquid (46.83 g; 92.9 percent).

Part 3: Prep of $C_5Me_4HSiMe_2NH^tBu$

In the drybox, a 3-necked 2 L flask was charged with 37.4 g of t-butylamine and 210 mL of THF. $C_5Me_4HSiMe_2Cl$ (25.47 g) was slowly dripped into the solution over 3–4 hours. The solution turned cloudy and yellow. PTe mixture was stirred overnight and the volatile materials removed under reduced pressure. The residue was extracted with diethyl ether, the solution was filtered, and the ether removed under reduced pressure to leave the $C_5Me_4HSiMe_2NH^tBu$ as a clear yellow liquid (26.96 g; 90.8 percent).

Part 4: Prep of $[MgCl]_2[Me_4C_5SiMe_2N^tBu](THF)_x$

In the drybox, 14.0 mL of 2.0 M isopropylmagnesium chloride in ether was syringed into a 250 mL flasks The ether was removed under reduced pressure to leave a colorless oil. 50 mL of a 4:1 (by volume) toluene:THF mixture was added followed by 3.50 g of $Me_4HC_5SiMe_2NH^tBu$. The solution was heated to reflux. After refluxing for 2 days, the solution was cooled and the volatile materials removed under reduced pressure. The white solid residue was slurried in pentane and filtered to leave a white powder, which was washed with pentane and dried under reduced pressure. The white powder was identified as $[MgCl]_2[Me_4C_5SiMe_2N^tBu](THF)_x$ (yield: 6.7 g).

Part 5: Prep of $[C_5Me_4(SiMe_2N^tBu)]TiCl_2$

In the drybox, 0.50 g of $TiCl_3(THF)_3$ was suspended in 10 mL of THF. 0.69 g of solid $[MgCl]_2[Me_4C_5SiMe_2N^tBu](THF)_x$ was added, resulting in a color change from pale blue to purple. After 15 minutes, 0.35 g of AgCl was added to the solution. The color immediately began to lighten to a pale green/yellow. After 1.5 hours, the THF was removed under reduced pressure to leave a yellow-green solid. Toluene (20 mL) was added, the solution was filtered, and the toluene was removed under reduced pressure to leave a yellow-green solid, 0.51 g (quantitative yield) identified by 1H NMR as $[C_5Me_4(SiMe_2N^tBu)]TiCl_2$.

Part 6: Preparation of $[C_5Me_4(SiMe_2N^tBu)]TiMe_2$

In an inert atmosphere glove box, 9.031 g of $[C_5Me_4(Me_2SiN^tBu)]TiCl_2$ is charged into a 250 ml flask and dissolved into 100 ml of THF. This solution is cooled to about −25 C. by placement in the glove box freezer for 15 minutes. To the cooled solution is added 35 ml of a 1.4 M MeMgBr solution in toluene/THF (75/25). The reaction mixture is stirred for 20 to 25 minutes followed by removal of the solvent under vacuum. The resulting solid is dried under vacuum for several hours. The product is extracted with pentane (4×50 ml) and filtered. The filtrate is combined and the pentane removed under vacuum giving the catalyst as a straw yellow solid.

The metal complex, $[C_5Me_4(SiMe_2N^tBu)]TiMe_2$, solution for Examples 2 and 3 is prepared as follows:

In an inert atmosphere glove box 10.6769 g of a tetrahydrofuran adduct of titanium trichloride, $TiCl_3(THF)_3$, is loaded into a 1 L flask and slurried into 300 ml of THF. To this slurry, at room temperature, is added 17.402 g of $[MgCl]_2[N^tBuSiMe_2C_5Me_4](THF)_x$ as a solid. An additional 200 ml of THF is used to help wash this solid into the reaction flask. This addition resulted in an immediate reaction giving a deep purple solution. After stirring for 5 minutes 9.23 ml of a 1.56 M solution of $CH_2C_2$ in THF is added giving a quick color change to dark yellow. This stage of the reaction is allowed to stir for about 20 to 30 minutes. Next, 61.8 ml of a 1.4 M MeMgBr solution in toluene/THF(75/25) is added via syringe. After about 20 to 30 minutes stirring time the solvent is removed under vacuum and the solid dried. The product is extracted with pentane (8×50 ml) and filtered. The filtrate is combined and the pentane removed under vacuum giving the metal complex as a tan solid.

The metal complex, $[C_5Me_4(SiMe_2N^tBu)]TiMe_2$, solution for Example 4 is prepared as follows:

In an inert atmosphere glove box 4.8108 g of $TiCl_3(THF)_3$ is placed in a 500 ml flask and slurried into 130 ml of THF. In a separate flask 8.000 g of $[MgCl]_2[N^tBuSiMe_2C_5Me_4](THF)_x$ is dissolved into 150 ml of THF. These flasks are removed from the glove box and attached to a vacuum line and the contents cooled to −30 C. The THF solution of $[MgCl]_2[N^tBuSiMe_2C_5Me_4](THF)_x$ is transferred (over a 15 minute period) via cannula to the flask containing the $TiCl_3(THF)_3$ slurry. This reaction is allowed to stir for 1.5 hours over which time the temperature warmed to 0 C. and the solution color turned deep purple. The reaction mixture is cooled back to −30 C. and 4.16 ml of a 1.56 M $CH_2Cl_2$ solution in THF is added. This stage of the reaction is stirred for an additional 1.5 hours and the temperature warmed to −10 C. Next, the reaction mixture is again cooled to −40 C. and 27.81 ml of a 1.4 M MeMgBr solution in toluene/THF (75/25) was added via syringe and the reaction is now allowed to warm slowly to room temperature over 3 hours. After this time the solvent is removed under vacuum and the solid dried. At this point the reaction flask is brought back into the glove box where the product is extracted with pentane (4×50 ml) and filtered. The filtrate is combined and the pentane removed under vacuum giving the catalyst as a tan solid. The metal complex is then dissolved into a mixture of $C_8$–$C_{10}$ saturated hydrocarbons (e.g., Isopar™ E, made by Exxon) and ready for use in polymerization.

Polymerization

Figure 1:
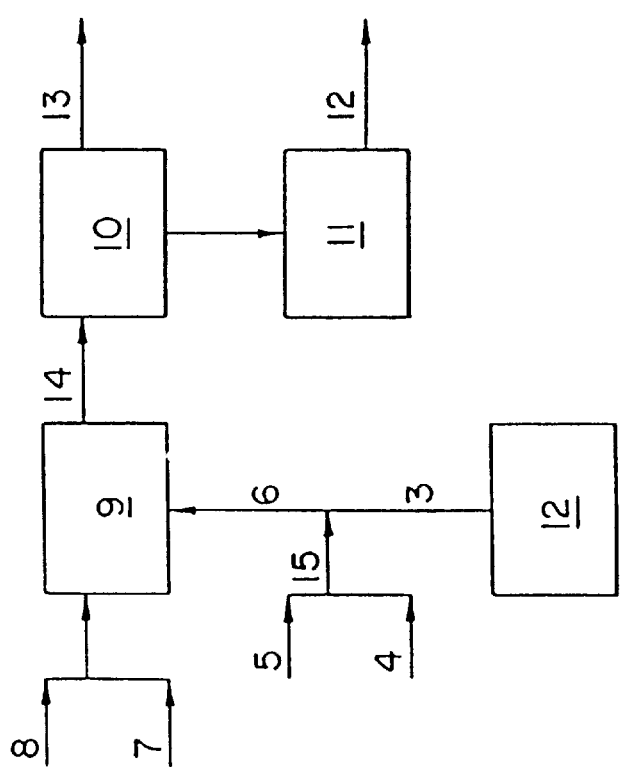
FIG. 1 is a schematic representation of a polymerization process suitable for making the polymers of the present invention.

The polymer products of Examples 1–4 are produced in a solution polymerization process using a continuously stirred reactor. Additives (e.g., antioxidants, pigments, etc.) can be incorporated into the interpolymer products either during the pelletization step or after manufacture, with a subsequent re-extrusion. Examples 1–4 are each stabilized with 1250 ppm calcium stearate, 200 ppm Irganox 1010, and 1600 ppm Irgafos 168. Irgafos™ 168 is a phosphite stabilizer and Irganox™ 1010 is a hindered polyphenol stabilizer (e.g., tetmids [methylene 3-(3,5-ditertbutylhydroxyphenylpropionate)]methane. Both are trademarks of and made by Ciba-Geigy Corporation. A representative schematic for the polymerization process is shown in FIG. 1.

The ethylene (4) and the hydrogen are combined into one stream (15) before being introduced into the diluent mixture (3). Typically, the diluent mixture comprises a mixture of $C_8$–$C_{10}$ saturated hydrocarbons (1), (e.g., Isopar™E, made by Exxon) and the comonomer(s) (2). For Example 1, the comonomer is 1-octene. The reactor feed mixture (6) is continuously injected into the reactor (9). The metal complex (7) and the cocatalyst (8) (the cocatalyst is tris (pentafluorophenyl)borane for Examples 1–4 herein which forms the ionic catalyst in situ) are combined into a single stream and also continuously injected into the reactor. Sufficient residence time is allowed for the metal complex and cocatalyst to react to the desired extent for use in the polymerization reactions, at least about 10 seconds. For the polymerization reactions of Examples 1–4, the reactor pressure is held constant at about 490 psig. Ethylene content of the reactor, after reaching steady state, is maintained below about 8 percent.

After polymerization, the reactor exit stream (14) is introduced into a separator (10) where the molten polymer is separated from the unreacted comonomer(s), unreacted ethylene, unreacted hydrogen, and diluent mixture stream (13). The molten polymer is subsequently strand chopped or pelletized and, after being cooled in a water bath or pelletizer (1), the solid pellets are collected (12). Table I describes the polymerization conditions and the resultant polymer properties:

long chain branches/1000 total carbon atoms using a 600 MHz $^{13}$C. NMR.

EXAMPLE 5, 6

Comparative Examples 7–9

Examples 5, 6 and Comparison Examples 7–9 with the same melt index are tested for rheology Comparison. Examples 5 and 6 are the substantially linear ethylene/1-

TABLE I

| Example | 1* | 2 | 3 | 4 |
|---|---|---|---|---|
| Ethylene feed rate (lbs/hour) | 3.2 | 3.8 | 3.8 | 3.8 |
| Comonomer/Total Olefin ratio* (mole percent) | 12.3 | 0 | 0 | 0 |
| Hydrogen/ethylene ratio (mole percent) | 0.054 | 0.072 | 0.083 | 0.019 |
| Diluent/ethylene ratio (weight basis) | 9.5 | 7.4 | 8.7 | 8.7 |
| Metal complex conc. (molar) | 0.00025 | 0.0005 | 0.001 | 0.001 |
| Metal complex flow rate (ml/min) | 5.9 | 1.7 | 2.4 | 4.8 |
| Cocatalyst conc. (molar) | 0.001 | 0.001 | 0.002 | 0.002 |
| Cocatalyst flow rate (ml/min) | 2.9 | 1.3 | 6 | 11.9 |
| Reactor temp (EC) | 114 | 160 | 160 | 200 |
| Polymer conceNtration (wt %) in the reactor exit stream | 7.1 | 8.4 | 9.5 | 8.4 |
| Comonomer concentration (wt %) in the reactor exit stream | 3.8 | 0 | 0 | 0 |
| Ethylene conc. in the reactor exit stream (weight percent) | 2.65 | 3.59 | 0.86 | 1.98 |
| Product $I_2$ (g/10 minutes) | 1.22 | 0.96 | 1.18 | 0.25 |
| Product density (g/cm$^3$) | 0.903 | 0.954 | 0.954 | 0.953 |
| Product $I_{10}/I_2$ | 6.5 | 7.4 | 11.8 | 16.1 |
| Single DSC Melting Peak (C) | 97 | 132 | 131 | 132 |
| Product $M_w$ | 95,400 | 93,800 | 71,600 | 105,800 |
| Product $M_n$ | 50,000 | 48,200 | 34,200 | 51,100 |
| Product $M_w/M_s$ | 1.91 | 1.95 | 2.09 | 2.07 |
| Ethylene Conversion (%) | 71 | 70 | 92 | 81 |
| LCB/Chain | N.M.** | — | 0.53 | 0.66 |
| LCB/10,000 Carbons | N.M.** | — | 2.2 | 1.8 |
| Aluminium Residue (ppm) | 0 | 0 | 0 | 0 |

*For Example 1, the Comonomer/Total Olefin ratio is defined as the percentage molar ratio of 1-octene/(1-octene+ethylene). Ex. 1* is a Comparative Example since the copolymer has onset of gross melt fracture less than 4×10$^6$ dyne/cm$^2$. **N.M.=Not Measured.

The $^{13}$C NMR spectrum of Example 3 (ethylene homopolymer) shows peaks which can be assigned to the alpha,delta$^+$, beta,delta$^+$ and methine carbons associated with a long chain branch. Long chain branching is determined using the method of Randall described earlier in this disclosure, wherein he states that "Detection of these resonances in high-density polyethylenes where no 1-olefins were added during the polymerization should be strongly indicative of the presence of long chain branching." Using the equation 141 from Randall (p. 292):

$$\text{Branches per 10,000 carbons} = [1/3(\text{alpha})/T_{T\alpha}] \times 10^4,$$

wherein alpha=the average intensity of a carbon from a branch (alpha,delta$^+$) carbon and $T_{T\alpha}$=the total carbon intensity. The number of long chain branches in this sample is determined to be 3.4 per 10,000 total carbon atoms, or 0.34 long chain branches/1000 total carbon atoms using 300 MHz $^{13}$C NMR, and 2.2 per 10,000 total carbon atoms, or 0.22 octene copolymers produced by the constrained geometry catalyst technology, as described in Example 1, with the exception that lower ethylene concentrations were used for Examples 5 and 6 providing for higher $I_{10}/I_2$ ratios and consequently more long chain branching than Example 1. Examples 5 and 6 are stabilized as Examples 1–4. Comparison Examples 7, 8 and 9 are conventional heterogeneous Ziegler polymerization blown film resins Dowlex™ 2045A, Attane™ 4201, and Attane™ 4403, respectively, all of which are ethylene/1-octene copolymers made by The Dow Chemical Company.

Comparative Example 7 is stablized with 200 ppm Irganox™ 1010, and 1600 ppm Irgafos™ 168 while Comparative Examples 8 and 9 are stablized with 200 ppm Irganox™ 1010 and 800 ppm PEPQ™. PEPQ™ is a trademark of Sandoz Chemical, the primary ingredient of which is believed to be tetrak-(2,4di-tertbutyl-phenyl)4,4' biphenylphosphonite. A comparison of the physical properties of each Example and Comparative Example is listed in Table II.

TABLE II

| Property | Ex. 5 | Ex. 6 | Comparative Example 7 | Comparative Example 8 | Comparative Example 9 |
|---|---|---|---|---|---|
| $I_2$ (g/10 minutes) | 1 | 1 | 1 | 1 | 0.76 |
| Density (g/cm$^3$) | 0.92 | 0.902 | 0.92 | 0.912 | 0.905 |
| $I_{10}/I_2$ | 9.45 | 7.61 | 7.8–8 | 8.2 | 8.7 |
| Product $M_w$ | 73,800 | 96,900 | 124,600 | 122,500 | 135,300 |
| Product $M_n$ | 37,400 | 46,400 | 34,300 | 32,500 | 31,900 |
| Product $M_w/M_n$ | 1.97 | 2.09 | 3.5–3.8 | 3.8 | 3.8–4.2 |
| DSC Melt Peak(s) (C) | 111 | 95 | 114, 118, 122 | 100, 116, 121 | 96, 116, 121 |

Figure 2:
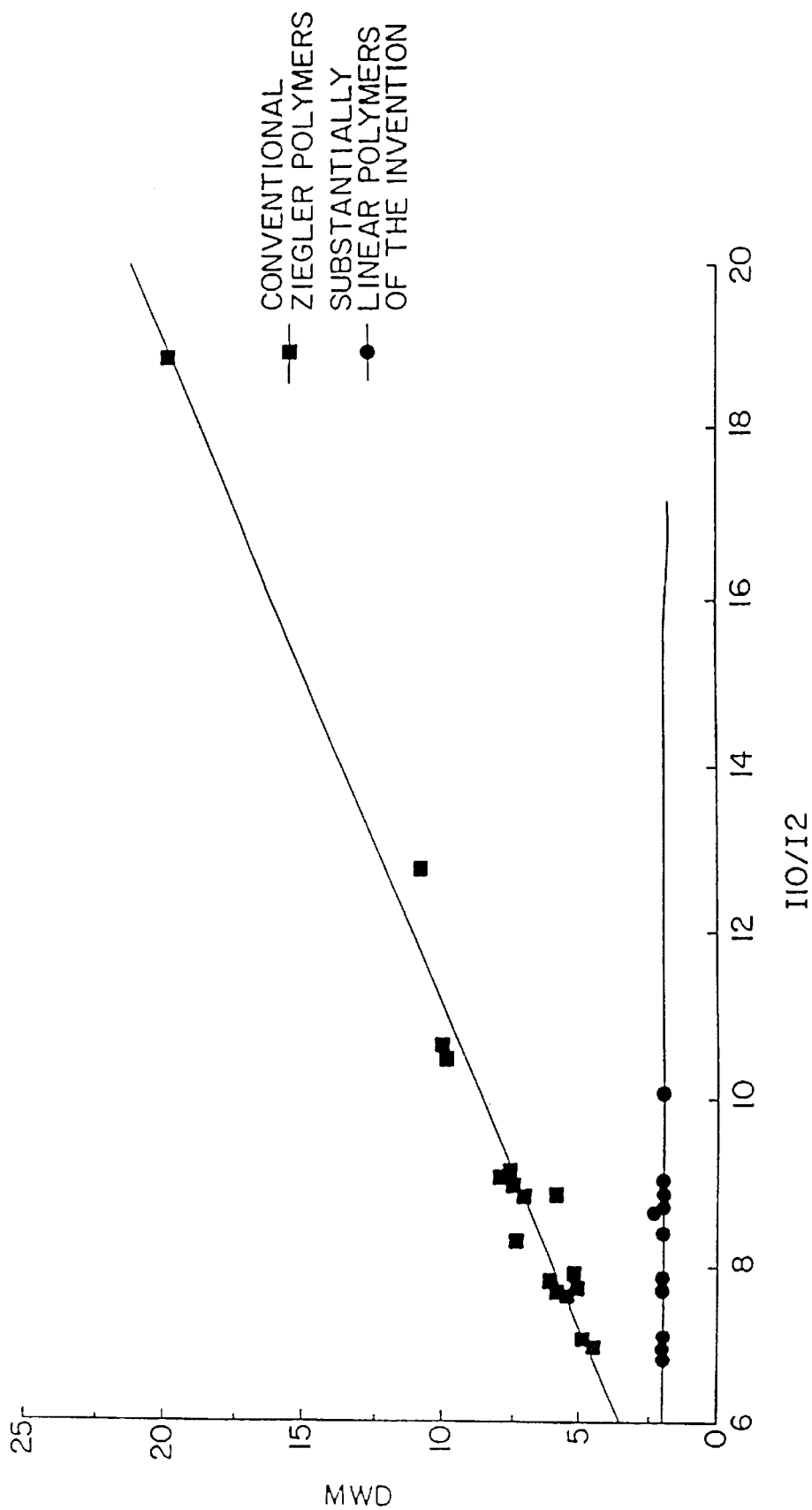
FIG. 2 plots data describing the relationship between $I_{10}/I_2$ and $M_w/M_n$, for two examples of the invention, and for some comparative examples.

Surprisingly, even though the molecular weight distribution of Examples 5 and 6 is narrow (i.e., $M_w/M_n$ is low), the $I_{10}/I_2$ values are comparable or higher in comparison with Comparative Examples 7–9. A comparison of the relationship between $I_{10}/I_2$ vs. $M_w/M_n$ for 2some of the novel polymers described herein and conventional heterogeneous Ziegler polymers is given in FIG. 2. The $I_{10}/I_2$ value for the novel polymers of the present invention is essentially independent of the molecular weight distribution, $M_w/M_n$ which is not true for conventional Zieler polymerized resins.

Figure 3:
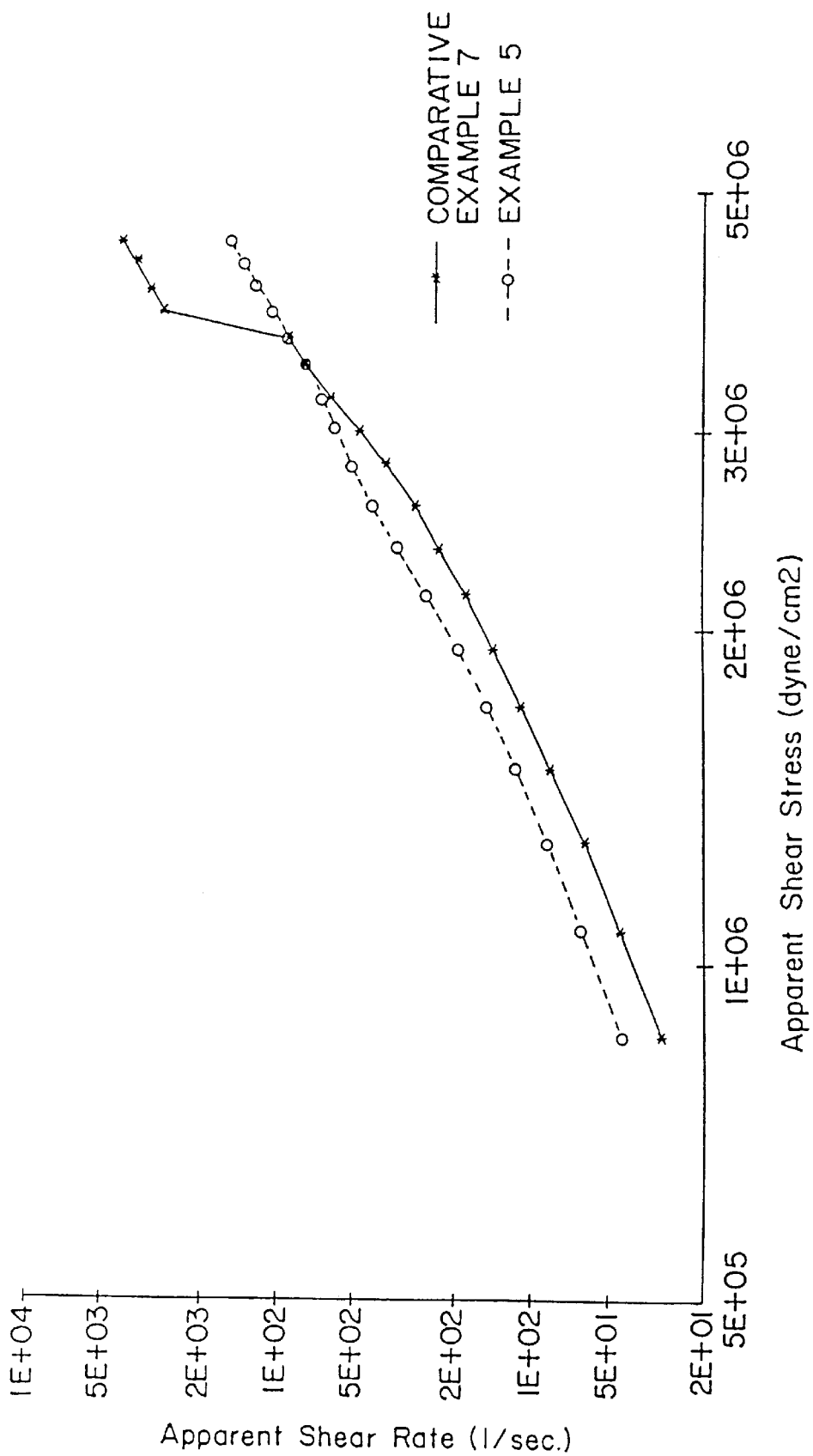
FIG. 3 plots the shear stress versus shear rate for an Example of the invention and for a Comparative Example, described herein.

Example 5 and Comparative Example 7 with similar melt index and density (Table II) are also extruded via a Gas Extrusion Rheometer (GER) al 190 C. using a 0.0296" diameter, 20:1 L/D die. The processing index (P.I.) is measured at an apparent shear stress of $2.15 \times 10^6$ dyne/cm$^2$ as described previously. The onset of gross melt fracture can easily be identified from the shear stress vs. shear rate plot shown in FIG. 3 where a sudden jump of shear rate occurs. A comparison of the shear stresses and corresponding shear rates before the onset of gross melt fracture is listed in Table III. It is particularly interesting that the PI of Example 5 is more than 20 percent lower than the PI of Comparative Example 7 and that the onset of melt fracture or sharkskin for Example 5 is also at a significantly higher shear stress and shear rate in comparison with the Comparative Example 7. Furthermore, the Melt Tension (MT) as well as Elastic Modulus of Example 5 are higher than that of Comparative Example 7.

Note that each of the Comparative Examples 7–9 has three distinct melting peaks as measured by DSC, which is evidence of their heterogeneous branching distribution. In contrast, the polymers of Examples 5 and 6 have a single melting peak as measured by DSC between the temperatures of –30 and 150 C. which is evidence of the homogeneity of the polymers branching distribution. Furthermore, the single melting peaks of Examples 5 and 6 indicate that each polymer is not a "blend" unlike the polymers disclosed in U.S. Pat. No. 5,218,071.

TABLE III

| Property | Example 5 | Comparative Example 7 |
|---|---|---|
| $I_2$ (g/10 minutes) | 1 | 1 |
| $I_{10}/I_2$ | 9.45 | 7.8–8 |
| PI (kpoise) | 11 | 15 |
| Melt tension (gms) | 1.89 | 1.21 |
| Elastic modulus at 0.1 rad/sec (dynes/cm$^2$) | 2425 | 882.6 |

TABLE III-continued

| Property | Example 5 | Comparative Example 7 |
|---|---|---|
| OGMF*, critical shear rate (1/sec) | >1556 (not observed) | 936 |
| OGMF*, critical shear stress (MPa) | ≧0.452 (not observed) | 0.366 |
| OMF**, critical shear rate (1/sec) | >1566 (not observed) | about 628 |
| OSMF**, critical shear stress (MPa) | ≧0.452 (not observed) | about 0.25 |

*Onset of Gross Melt Fracture.
**Onset of Surface Melt Fracture.

Example 6 and Comparison Example 9 have similar melt index and density, but Example 6 has lower $I_{10}/I_2$ (Table IV). These polymers are extruded via a Gas Extrusion Rheometer (GER) at 190 C. using a 0.0296 inch diameter, 20:1 L/D die. The processing index (PI) is measured at an apparent shear stress of $2.15 \times 10^6$ dyne/cm$^2$ as described previously.

TABLE IV

| Property | Example 6 | Comparative Example 9 |
|---|---|---|
| $I_2$ (g/10 minutes) | 1 | 0.76 |
| $I_{10}/I_2$ | 7.61 | 8.7 |
| PI (kpoise) | 14 | 15 |
| Melt tension (gms) | 1.46 | 1.39 |
| Elastic modulus at 0.1 rad/sec (dynes/cm$^2$) | 1481 | 1921 |
| OGMF*, critical shear rate (1/sec) | 1186 | 652 |
| OGMF*, critical shear stress (MPa) | 0.431 | 0.323 |
| OSMF**, critical shear rate (1/sec) | about 764 | about 402 |
| OSMF**, critical shear stress (MPa) | 0.366 | 0.280 |

*Onset of Gross Melt Fracture.
**Onset of Surface Melt Fracture.

Figure 4:
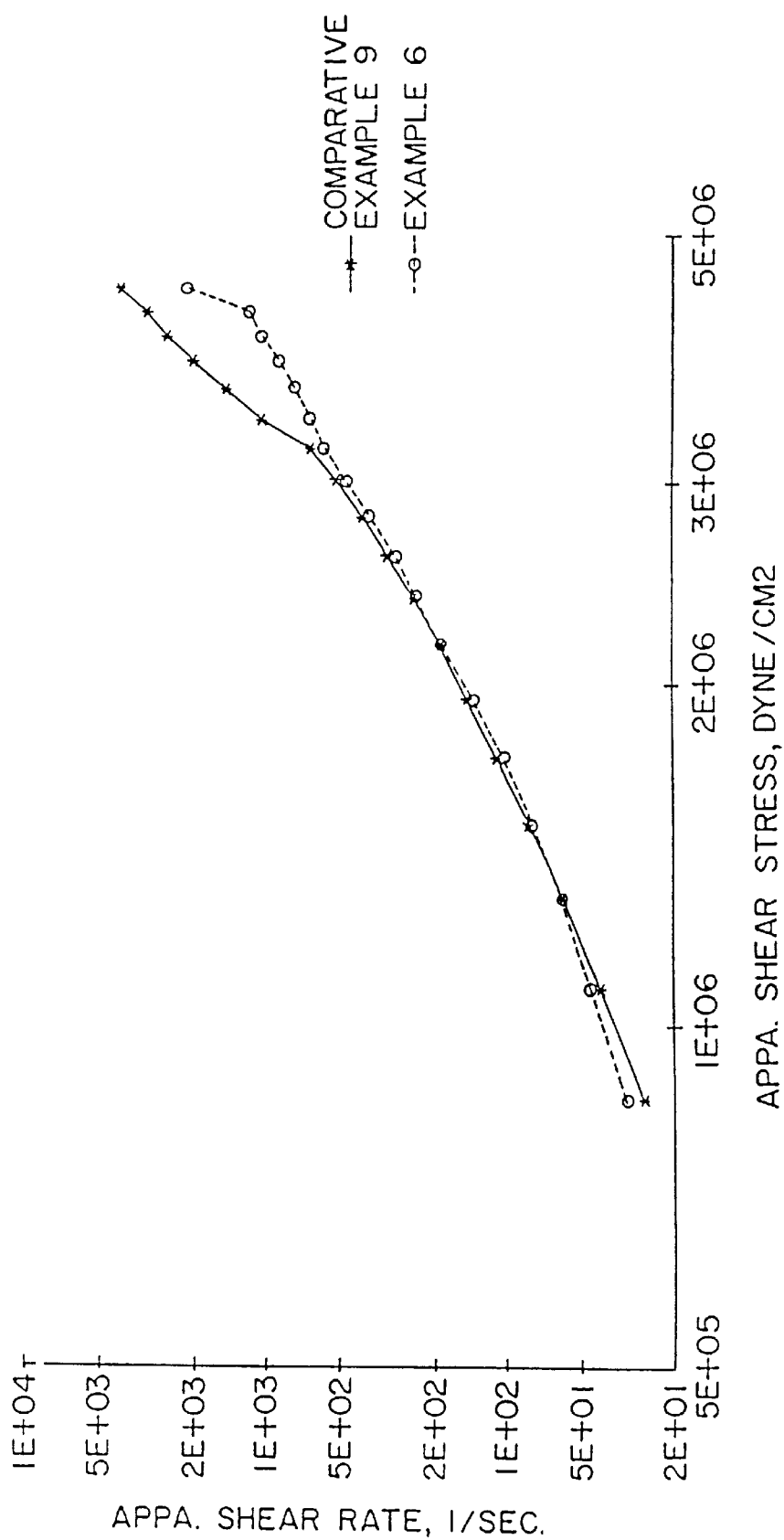
FIG. 4 plots the shear stress versus shear rate for an Example of the invention and for a Comparative Example, described herein.

The onset of gross melt fracture can easily be identified from the shear stress vs. shear rate plot shown in FIG. 4 where a sudden increase of shear rate occurs at an apparent shear stress of about $3.23 \times 10^6$ dyne/cm$^2$ (0.323 MPa). A comparison of the critical shear stresses and corresponding critical shear rates at the onset of gross melt fracture is listed in Table IV. The PI of Example 6 is surprisingly about the same as Comparative Example 9, even though the $I_{10}/I_2$ is lower for Example 6. The onset of melt fracture or sharkskin for Example 6 is also at a significantly higher shear stress and shear rate in comparison with the Comparative Example 9. Furthermore, it is also unexpected that the Melt Tension (MT) of Example 6 is higher than that of Comparative Example 9, even though the melt index for Example 6 is slightly higher and the $I_{10}/I_2$ is slightly lower than that of Comparative Example 9.

Comparative Examples 10–19

Batch ethylene/1-octene polymerizations were conducted under the following conditions:

Preparation of [HNEt$_3$]+[MeB(C$_6$F$_5$)$_3$]—

A 100 ml flask was charged with 1.00 gram of tris (pentafluorophenyl)boron (1.95 mmoi) and 70 ml of anhydrous pentane. After dissolution, 1.5 ml of MeLi (1.4 M in diethyl ether, 2.1 mmol, 1.07 equiv) was added at 25 C. via syringe. A milky white mixture formed immediately and, after several minutes, two phases formed. The mixture was stirred for 15 hr and then the upper layer decanted. The viscous lower layer was washed twice with 30 ml of pentane and concentrated in vacuo for 2 hours to give a clear, colorless, viscous oil. Under nitrogen, the oil was quenched with a 40 ml of an aqueous 0.5 M HNEt$_3$Cl solution (20 mmol, 10 equiv) which had previously been cooled to 0 C. A white, gooey precipitate formed instantly. After two minutes, the solid was collected by filtration and washed twice with 20 ml of 0.5 M HNEt$_3$Cl solution followed by two washings with distilled water. The solid was dehydrated under high vacuum at 25 C. for 15 hours to give a powdery white solid (0.77 grams, 63%) which was identified as the desired triethylammonium tris(pentafluorophenyl) methylborate salt.

Preparation of [HNEt$_3$]+[(allyl)B(C$_6$F$_5$)$_3$]—

A 100 ml flask was charged with 1.00 gram of tris (pentafluorophenyl)boron (1.95 mmol) and 40 ml of anhydrous pentane. After dissolution, 2.05 ml of (allyl)MgBr (1.0 M in diethyl ether, 2.05 mmol, 1.05 equiv) was added at 25 C. via syringe. A cloudy white mixture formed immediately and, after several minutes, two phases formed. The mixture was stirred for 15 hr and then the upper layer decanted. The viscous lower layer was washed twice with 30 ml of pentane and concentrated in vacuo for 2 hours to give a clear, colorless, viscous oil. Under nitrogen, the oil was quenched with a 40 ml of an aqueous 0.5 M HNEt$_3$Cl solution (20 mmol, 10 equiv) which had previously been cooled to 0 C. A gooey, white precipitate formed after several minutes. The solid was collected by filtration and washed twice with 20 ml of 0.5 M HNEt$_3$Cl solution followed by two washings with distilled water. The solid was dehydrated under high vacuum at 25 C. for 15 hours to give a pasty white solid (0.39 grams, 30%) which was identified as the desired triethylammonium tris(pentafluorophenyl)allylborate salt Batch Reactor Polymerization Procedure A 2 L stirred autoclave was charged with the desired amounts of a mixed alkane solvent (Isopar® E, available from Exxon Chemicals, Inc.) and 1-octene comonomer. The reactor was heated to the polymerization temperature. Hydrogen was added by differential pressure expansion from a 75 ml addition tank.

The term "hydrogen delta psi" in Table I represents the difference in pressure between the starting and final pressure in the hydrogen addition tank after adding hydrogen to the 2L reactor containing a total of approximately 1200 ml of solvent and 1-octene. The reactor was heated to the polymerization temperature and was saturated with ethylene to the desired pressure. For these experiments, a constant ethylene/solvent pressure of about 500 psig at a temperature of 140 C. corresponds to an ethylene concentration of about 8.4 percent by weight of the reactor contents. Metal complex and cocatalyst were mixed in a drybox by syringing the desired amount of 0.0050 M metal complex solution (in Isopar® E or toluene) into a solution of the cocatalyst (in Isopar® E or toluene). This solution was then transferred to a catalyst addition tank and injected into the reactor. The polymerization was allowed to proceed for the desired time and then the solution was drained from the bottom of the reactor and quenched with isopropanol About 100 mg of a hindered phenolic antioxidant (Irganox® 1010, available from Ciba-Geigy corporation) was added and the polymer was air dried overnight. The residual solvent was removed in a vacuum oven overnight. The results are shown in Table V and VA:

TABLE V

| Comp. Ex. | H$_2$ (psi) | 1-octene (gms) | Isopar E (gms) | yield (gms) | Effcny. (gm/gm Ti) | Aluminum (ppm) |
|---|---|---|---|---|---|---|
| 10A* | 50 | 38 | 820 | 39.6 | 330,689 | 0 |
| 11A* | 25 | 38 | 820 | 70.1 | 390,257 | 0 |
| 12A* | 35 | 38 | 820 | 46.4 | 258,316 | 0 |
| 13A* | 30 | 38 | 820 | 48.8 | 271,677 | 0 |
| 14A* | 35 | 30 | 828 | 52.1 | 290,049 | 0 |
| 15A* | 27 | 38 | 820 | 36.5 | 152,401 | 0 |
| 16A** | 26 | 38 | 820 | 47.8 | 266,110 | 0 |
| 17B*** | 35 | 40 | 818 | 19.7 | 41,127 | 6850 |
| 18B*** | 50 | 40 | 818 | 19.7 | 41,127 | 6850 |
| 19B*** | 25 | 40 | 818 | 18.3 | 38,204 | 7380 |

A = metal complex of [(C$_5$Me$_4$)SiMe$_2$N(t-Bu)] TiMe$_2$ (as in USP 5,064,802)
B = metal complex of [(C$_5$Me$_4$)SiMe$_2$N(t-Bu))9 TiCl$_2$ (as in USP 5,026,798)
* = Cocatalyst of [Et$_3$NH] + [(allyl)B(C$_6$F$_5$)$_3$]-(as in USP '802)
** = Cocatalyst of [Et$_3$NH] + [(Me)B(C$_6$F$_5$)$_3$]-(as in USP '802)
*** = methyl aluminoxane (MAO) (as in USP '798)
Reactor temperature is constant at about 140° C.
Ethylene/solvent pressure is constant at about 500 psig
Run time is about 15 minutes

TABLE VA

| Comp. Ex. | μmoles complex | μmoles cocatalyst | Irganox 1010 (ppm) |
|---|---|---|---|
| 10A* | 2.5 | 2.5 | 2500 |
| 11A* | 3.75 | 3.75 | 1400 |
| 12A* | 3.75 | 3.75 | 2200 |
| 13A* | 3.75 | 3.75 | 2000 |
| 14A* | 3.75 | 3.75 | 1900 |
| 15A* | 5 | 5 | 2700 |
| 16A* | 3.75 | 3.75 | 2000 |
| 17B*** | 10 | 5000 | 5000 |
| 18B*** | 10 | 5000 | 5000 |
| 19B*** | 10 | 5000 | 5500 |

A = metal complex of [(C$_5$Me$_4$)SiMe$_2$N(t-Bu)] TiMe$_2$ (as in USP 5,064,802)
B = metal complex of [(C$_5$Me$_4$)SiMe$_2$N(t-Bu)] TiCl$_2$ (as in USP 5,026,798)
* = Cocatalyst of [Et$_3$NH] + [(allyl)B(C$_6$F$_5$)$_3$]-(as in USP '802)
** = Cocatalyst of [Et$_3$NH] + [(Me)B(C$_6$F$_5$)$_3$]-(as in USP '802)
*** = methyl aluminoxane (MAO) (as in USP '798)
Reactor temperature is constant at about 140 C
Ethylene/solvent pressure is constant at about 500 psig
Run time is about 15 minutes The samples were each extruded via a Gas Extrusion Rheometer (GER) at 190 C. using 0.0296 inch diameter die (preferably 0.0143 inch diameter die for high flow polymers, e.g. 50–100 MI or greater) having L/D of 20:1 and entrance angle of 180 degrees, as shown in the attached drawing. The OGMF can easily be identified from the shear stress vs. shear rate plot where a sudden jump of shear rate occurs or when the surface of the extrudate becomes very rough or irregular, or from deep ridges which can be clearly detected by visual observation. OSMF is characterized by fine scale surface irregularities ranging from loss of surface gloss to the more severe form of matte or sharkskin which can easily be seen using microscopy at a magnification of 40×.

Table VI displays the test results from Comparative Examples 10–19:

TABLE VI

| Comp. Ex. | $I_2$ (gm/ 10 min) | $I_{10}/I_2$ | $(I_{10}/I_2) - 4.63$ | Measured $M_w/M_n$ | OGMF* Shear Rate $(sec^{-1})$ | OGMF* Shear Stress (MPa) |
|---|---|---|---|---|---|---|
| 10 | 4.52 | 5.62 | 0.99 | 1.856 | 706 | 0.344 |
| 11 | 0.67 | 6.39 | 1.76 | 1.834 | 118 | 0.323 |
| 12 | 2.24 | 5.62 | 0.99 | 1.829 | 300 | 0.323 |
| 13 | 2.86 | 5.60 | 0.97 | 1.722 | 397 | 0.323 |
| 14 | 3.25 | 5.66 | 1.03 | 1.827 | 445 | 0.302 |
| 15 | 1.31 | 5.67 | 1.04 | 1.718 | 227 | 0.302 |
| 16 | 1.97 | 5.7 | 1.07 | 1.763 | 275 | 0.302 |
| 17 | 0.36 | 12.98 | 8.35 | 5.934 | <29 | .086 |
| 18 | 0.40 | 13.34 | 8.71 | 5.148 | <11.08 | <0.086 |
| 19 | 0.13 | 13.25 | 8.62 | 6.824 | <10.39 | <0.086 |

Comparative Examples 10–16 were prepared using the catalyst composition as described in U.S. Pat. No. 5,064,802 (Stevens et al.) as described above. Comparative Examples 17–19 were prepared using the catalyst composition described in U.S. Pat. No. 5,026,798 (Canich), as described above. All of the Comparative Polymer Examples made using a batch reactor at an ethylene concentration of about 8.4 percent by weight of the reactor contents or more tested had onset of gross melt fracture at a shear stress of less than or equal to 0.344 MPa ($3.44 \times 10^6$ dyne/cm$^2$).

Interestingly, an ethylene concentration of about 8.4 percent is considered to be on the low side for a batch polymerization procedure, since it limits the reaction kinetics and slows the polymerization process. Increasing the ethylene concentration in a batch reactor, as is taught in U.S. Pat. No. 5,026,798 (Canich), where the calculated propylene reactor concentrations for these ten examples ranges from a low of about 12.6 percent (Example 1) to a high of about 79 percent (Example 6), by weight of the reactor contents, results in polymerization of polymers which do not have the novel structure discovered by Applicants, as the OGMF data in Table VI demonstrates. Furthermore, the $I_{10}/I_2$ ratio of such comparative polymers made using a batch reactor at relatively high ethylene concentrations increases as the molecular weight distribution, $M_w/M_n$, increases, as is expected based on conventional Ziegler polymerized polymers.

EXAMPLE 20

Comparative Example 21

Blown film is fabricated from the two novel ethylene/1-octene polymers of Examples 5 and 6 made in accordance with the present invention and from two comparative conventional polymers made according to conventional Ziegler catalysis. The blown films are tested for physical properties, including heat seal strength versus heat seal temperature (shown in FIG. 5 for Examples 20 and 22 and Comparative Examples 21 and 23), machine (MD) and cross direction (CD) properties (e.g., tensile yield and break, elongation at break and Young's modulus). Other film properties such as dart, puncture, tear, clarity, haze, 20 degree gloss and block are also tested.

Blown Film Fabrication Conditions

The improved processing substantially linear polymers of the present invention produced via the procedure described earlier, as well as two comparative resins are fabricated on an Egan blown film line using the following fabrication conditions:

2 inch (5 cm) diameter extruder 3 inch (7.6 cm) die 30 mil die gap

25 RPM extruder speed

460 F. (238 C) melt temperature 1 mil gauge 2.7:1 Blow up ratio (12.5 inches (31.7 cm) layflat)

12.5 inches (31.7 cm) frost line height

The melt temperature is kept constant by changing the extruder temperature profile. Frost line height is maintained at 12.5 inches (31.7 cm) by adjusting the cooling air flow. The extruder output rate, back pressure and power consumption in amps are monitored throughout the experiment The polymers of the present invention and the comparative polymers are all ethylene/1-octene copolymers. Table VII summarizes physical properties of the two polymers of the invention and for the two comparative polymers:

TABLE VII

| Property | Example 20 | Comparative Example 21 | Example 22 | Comparative Example 23 |
|---|---|---|---|---|
| $I_2$ (g/10 minutes) | 1 | 1 | 1 | 0.8 |
| Density (g/cm$^3$) | 0.92 | 0.92 | 0.902 | 0.905 |
| $I_{10}/I_2$ | 9.45 | about 8 | 7.61 | 8.7 |
| $M_w/M_n$ | 1.97 | about 4 | 2.09 | about 5 |

Tables VIII and IX summarize the film properties measured for blown film made from two of these four polymers:

TABLE VIII

Blown film properties

| Property | Example 20 MD | Example 20 CD | Comparative Example 21 MD | Comparative Example 21 CD |
|---|---|---|---|---|
| Tensile yield (psi) | 1391 | 1340 | 1509 | 1593 |
| Tensile break (psi) | 7194 | 5861 | 6698 | 6854 |
| Elongation (percent) | 650 | 668 | 631 | 723 |
| Young's modulus (psi) | 18,990 | 19,997 | 23,086 | 23,524 |
| PPT* tear (gms) | 5.9 | 6.8 | 6.4 | 6.5 |

*Puncture Propagation Tear
MD = machine direction
CD = cross direction

TABLE IX

| Property | Example 20 | Comparative Example 21 |
|---|---|---|
| Dart A (grams) | 472 | 454 |
| Puncture (grams) | 235 | 275 |
| Clarity (percent transmittance) | 71 | 68 |
| Haze (percent) | 3.1 | 6.4 |
| 20 degree gloss | 114 | 81 |
| Block (grams) | 148 | 134 |

During the blown film fabrication, it is noticed that at the same screw speed (25 rpm) and at the same temperature profile, the extruder back pressure is about 3500 psi at about 58 amps power consumption for Comparative Example 21 and about 2550 psi at about 48 amps power consumption for Example 20, thus showing the novel polymer of Example 20 to have improved processability over that of a conventional heterogeneous Ziegler polymerized polymer. The throughput is also higher for Example 20 than for Comparative Example 21 at the same screw speed. Thus, Example 20 has higher pumping efficiency than Comparative Example 21 (i.e., more polymer goes through per turn of the screw).

Figure 5:
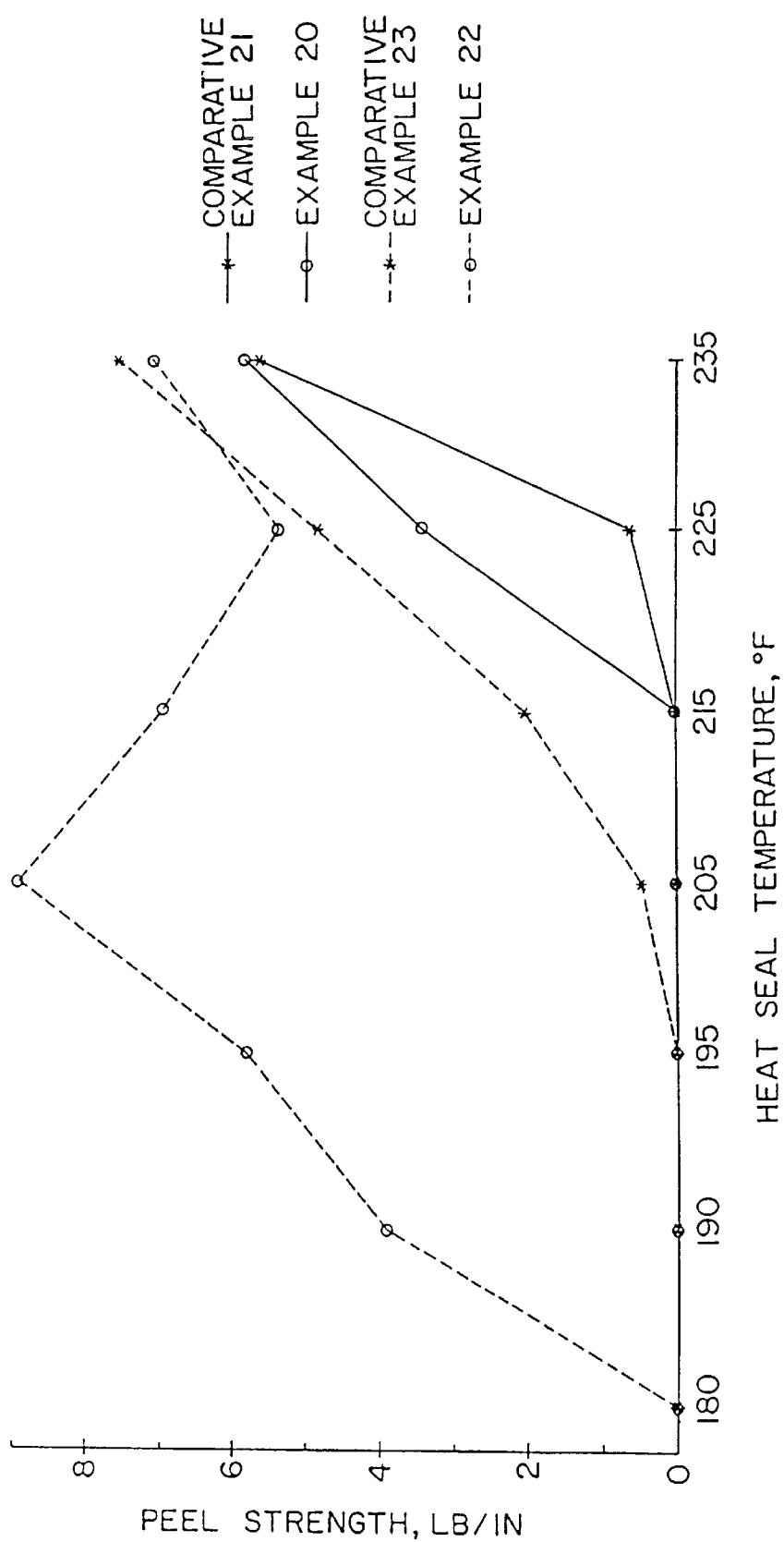
FIG. 5 plots the heat seal strength versus heat seal temperature of film made from Examples of the invention, and for Comparative Examples, described herein.

As FIG. 5 shows, the heat seal properties of polymers of the present invention are improved, as evidenced by lower heat seal initiation temperatures and higher heat seal strengths at a given temperature, as compared with conventional heterogeneous polymers at about the same melt index and density.

EXAMPLE 24 and 25

The polymer products of Examples 24 and 25 are produced in a continuous solution polymerization process using a continuously stirred reactor, as described in copending U.S. Pat. No. 5, 272,236. The metal complex [$C_5Me_4$(SiMe$_2$N$^t$Bu)]TiMe$_2$ is prepared as described in U.S. Pat. No. 5,272,236 and the cocatalysts used are tris (pentafluorophenyl) borane (B:Ti ratio of 2:1) and MMAO (Al:Ti ratio of 4:1). For Example 24 the ethylene concentration in the reactor is about 1.10 percent and for Example 25 the ethylene concentration in the reactor is about 1.02 percent (percentages based on the weight of the reactor contents). For each Example, the reactor is run without hydrogen.

Additives (e.g., antioxidants, pigments, etc.) can be incorporated into the interpolymer products either during the pelletization step or after manufacture, with a subsequent re-extrusion. Examples 24 and 25 are each stabilized with 1250 ppm Calcium Stearate, 200 ppm Irganox 1010, and 1600 ppm Irgafos 168. Irgafos™ 168 is a phosphite stabilizer and Irganox™ 1010 is a hindered polyphenol stabilizer (e.g., tetrakis [methylene3-(3,5-ditertbutyl4-hydroxyphenylpropionate)]methane. Both are trademarks of and made by Ciba-Geigy Corporation.

EXAMPLE 24

Comparative Example 26

Example 24 is an ethylene/1-octene elastic substantially linear ethylene polymer produced as described herein.

Comparative Example 26 is an ethylene/1-butene copolymer trademarked Exact™ made by Exxon Chemical containing butylated hydroxy toluene (BHT) and Irganox™ 1076 as polymeric stabilizers. Table X summarizes physical properties and rheological performance of Example 24 and Comparative Exanple 26:

TABLE X

| Property | Example 24 | Comparative Example 26 |
|---|---|---|
| $I_2$ (g/10 minutes) | 3.3 | 3.58 |
| Density (g/cm$^3$) | 0.870 | 0.878 |
| $I_{10}/I_2$ | 7.61 | 5.8 |
| $M_w/M_n$ | 1.97 | 1.95 |
| PI (kPoise) | 3.2 | 8.4 |
| Elastic Modulus @ 0.1 rad/sec (dyne/cm$^2$) | 87.7 | 8.3 |
| OSMF*, critical shear rate (sec$^{-1}$) | 660 | 250 |

*Onset of surface melt fracture

Even though Example 24 and Comparative Example 26 have very similar molecular weight distributions ($M_w/M_n$), $I_2$ and density, Example 24 has a much lower processing index (PI) (38 percent of the PI of Comparative Example 26), a much higher shear rate at the onset of surface melt fracture (264 percent of shear rate at onset of OSMF) and an elastic modulus an order of magnitude higher than Comparative Example 26, demonstrating that Example 24 has much better processability and higher melt elasticity than Comparative Example 26.

Elastic modulus is indicative of a polymer's melt stability, e.g., more stable bubbles when making blown film and lees neck-in during melt extrusion. Resultant physical properties of the finished film are also higher.

Onset of surface melt fracture is easily identified by visually observing the surface extrudate and noting when the extrudate starts losing gloss and small surface roughness is detected by using 40×magnification.

Figure 6:
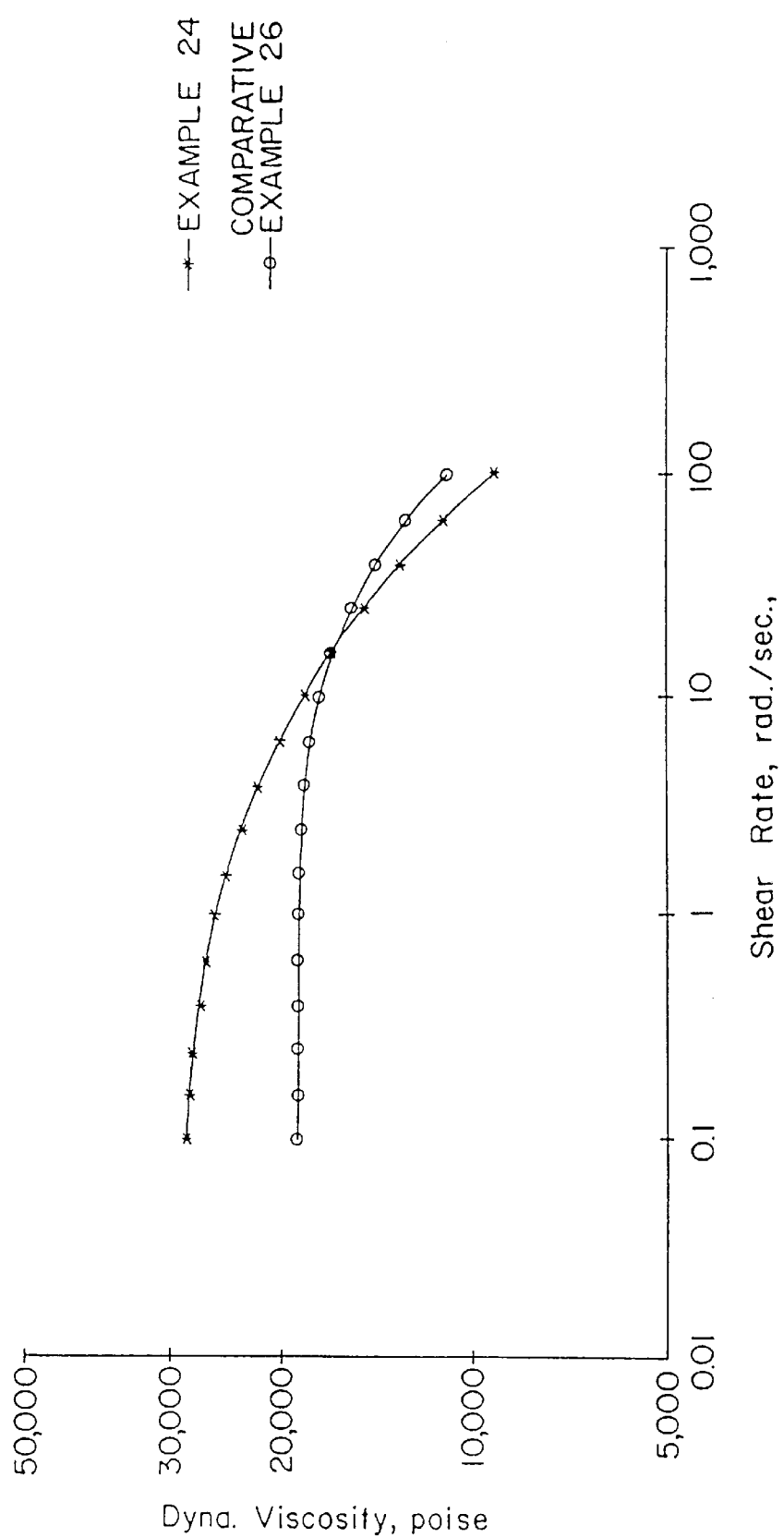
FIG. 6 graphically displays dynamic shear viscosity data for an elastic substantially linear ethylene polymer of the present invention and for a comparative linear polymer made using single site catalyst technology.

Dynamic shear viscosity of the polymers is also used to show differences between the polymers and measures viscosity change versus shear rate. A Rheometrics Mechanical Spectrometer (Model RMS 800) is used to measure viscosity as a function of shear rate. The RMS 800 is used at 190 C. at 15 percent strain and a frequency sweep (i.e., from 0.1–100 rad/sec) under a nitrogen purge. The parallel plates are positioned such that they have a gap of about 1.5–2 mm. Data for Example 24 and Comparative Example 26 are listed in Table XI and graphically displayed in FIG. 6.

TABLE XI

| Shear Rate (rad/sec) | Dynamic Viscosity (poise) for Example 24 | Dynamic Viscosity (poise) for Comparative Example 26 |
|---|---|---|
| 0.1 | 28290 | 18990 |
| 0.1585 | 28070 | 18870 |
| 0.2512 | 27630 | 18950 |
| 0.3981 | 27140 | 18870 |
| 0.631 | 26450 | 18840 |
| 1 | 25560 | 18800 |
| 1.585 | 24440 | 18690 |
| 2.512 | 23140 | 18540 |
| 3.981 | 21700 | 18310 |
| 6.31 | 20170 | 17960 |
| 10 | 18530 | 17440 |
| 15.85 | 16790 | 16660 |
| 25.12 | 14960 | 15620 |
| 39.81 | 13070 | 14310 |
| 63.1 | 11180 | 12750 |
| 100 | 9280 | 10960 |

Surprisingly, Example 24 shows a shear thinning behaviour, even though Example 24 has a narrow molecular weight distribution In contrast, Comparative Example 26 shows the expected behaviour of a narrow molecular weight distribution polymer, with a flatter viscosity/shear rate curve.

Thus, elastic substantially linear ethylene polymers made in accordance with the present invention (e.g. Example 24) have lower melt viscosity than a typical narrow molecular weight distribution linear copolymer made by single site catalyst technology at the melt processing shear rate region of commercial interest In addition, the novel elastic substantially linear ethylene polymers have a higher low shear/zero shear viscosity than the Comparative linear polymer, thus demonstrating that the copolymers of the invention have higher "green strength" which is useful for forming and maintaining blended compositions such as those used in the wire and cable coating industry, where the compounded materials must maintain their integrity at low or zero shear without segregating the components.

EXAMPLE 25

Comparative Example 27

Example 25 is an ethylene/1-octene elastic substantially linear ethylene polymer produced in a continuous solution polymerization process as described herein.

Comparative Example 27 is an ethylene/propene copolymer made by Mitsui PetroChemical Corporation and trademarked Tafmer™ P-0480. Table XII summarizes physical properties and rheological performance of these two polymers:

TABLE XII

| Property | Example 25 | Comparative Example 27 |
|---|---|---|
| $I_2$ (g/10 minutes) | 1.01 | 1.1 |
| Density (g/cm$^3$) | 0.870 | 0.870 |
| $I_{10}/I_2$ | 7.62 | 6.06 |
| $M_w/M_n$ | 1.98 | 1.90 |
| PI (kPoise) | 7.9 | 27.4 |
| Elastic Modulus @ 0.1 rad/sec (dyne/cm$^2$) | 964 | 567.7 |
| OSMF*, critical shear rate (sec$^{-1}$) | 781 | 105 |

*Onset of surface melt fracture

Even though Example 25 and Comparative Example 27 have similarly narrow molecular weight distributions ($M_w/M_n$), $I_2$ and density, Example 25 has a PI which is 28 percent of that of Comparative Example 27, a 743 percent of the shear rate at the onset of surface melt fracture and a higher elastic modulus than Comparative Example 27, demonstrating that Example 24 has much better processability than Comparative Example 27. Onset of surface melt fracture is easily identified by visually observing the surface extrudate and noting when the extrudate starts losing gloss and small surface roughness is detected by using 40×magnification.

EXAMPLES 28–37

Examples 28–35 are ethylene/propene copolymers made using the constrained geometry catalyst described herein and in a continuous solution polymerization process. Examples 36 and 37 are ethylene/1-butene copolymers made using the constrained geometry catalyst described herein and in a continuous solution polymerization process. Examples 28–37 each contained approximately 1250 ppm calcium strearate, 200 ppm Irganox 1010. These polymers did not, however, contain a secondary antioxidant (e.g. a phosphite). The low level of phenol (i.e. 200 ppm Irganox 1010) coupled with the lack of the secondary antioxidant may have contributed to the lower melt fracture performance of some of the polymers shown in Table XV. It is well known that thermally processing polyethylene polymers, especially in the presence of oxygen, can lead to oxidative crosslinking and extrusion variation, i.e. melt fracture. Table XIII and XIIIA describe the polymerization conditions and Table XIV describes the resultant polymer physical properties for Examples 28–35:

TABLE XIII

| Ex. | Reactor ethylene conc. (weight percent) | Estimated reactor PE conc. (weight percent) | Ethylene flow rate (lbs/hr) | Hydrogen/ethylene ratio (mole percent) |
|---|---|---|---|---|
| 28 | 5.3 | 6.0 | 3.19 | 0.048 |
| 29 | 4.2 | 7.3 | 3.19 | 0.024 |
| 30 | 4.0 | 8.9 | 3.19 | 0.028 |
| 31 | 3.5 | 9.3 | 3.18 | 0.024 |
| 32 | 2.5 | 10.6 | 3.20 | 0.027 |
| 33 | 2.6 | 10.7 | 3.18 | 0.007 |
| 34 | 1.3 | 10.5 | 3.19 | 0.027 |
| 35 | 1.0 | 10.9 | 3.19 | 0.010 |

TABLE XIIIA

| Ex. | Reactor temp (C) | Ethylene Conversion % | Diluent/ethylene ratio | Comonomer/olefin ratio* |
|---|---|---|---|---|
| 28 | 170 | 51 | 8.2 | 25.5 |
| 29 | 172 | 61 | 8.1 | 24.0 |
| 30 | 171 | 67 | 7.1 | 16.6 |
| 31 | 171 | 71 | 7.2 | 20.1 |
| 32 | 170 | 79 | 7.1 | 15.6 |
| 33 | 173 | 78 | 7.1 | 16.7 |
| 34 | 145 | 88 | 8.2 | 17.8 |
| 35 | 158 | 91 | 8.2 | 18.8 |

*Comonomer/total olefin ratio = percentage weight ratio of propene/(propene + ethylene).

TABLE XIV

| Ex. | $I_2$ (gms/10 minutes) | $I_{10}/I_2$ | Density (gm/cm$^3$) | $M_w/M_n$ |
|---|---|---|---|---|
| 28 | 1.08 | 7.8 | 0.9176 | 2.00 |
| 29 | 1.02 | 8.8 | 0.9173 | 2.17 |
| 30 | 0.82 | 9.2 | 0.9175 | 2.08 |
| 31 | 0.79 | 9.4 | 0.9196 | 2.04 |
| 32 | 1.01 | 10.6 | 0.9217 | 2.09 |
| 33 | 0.83 | 12.4 | 0.9174 | 2.31 |
| 34 | 0.54 | 15.2 | 0.9201 | 2.12 |
| 35 | 0.62 | 15.6 | 0.9185 | 2.32 |

Figure 7:
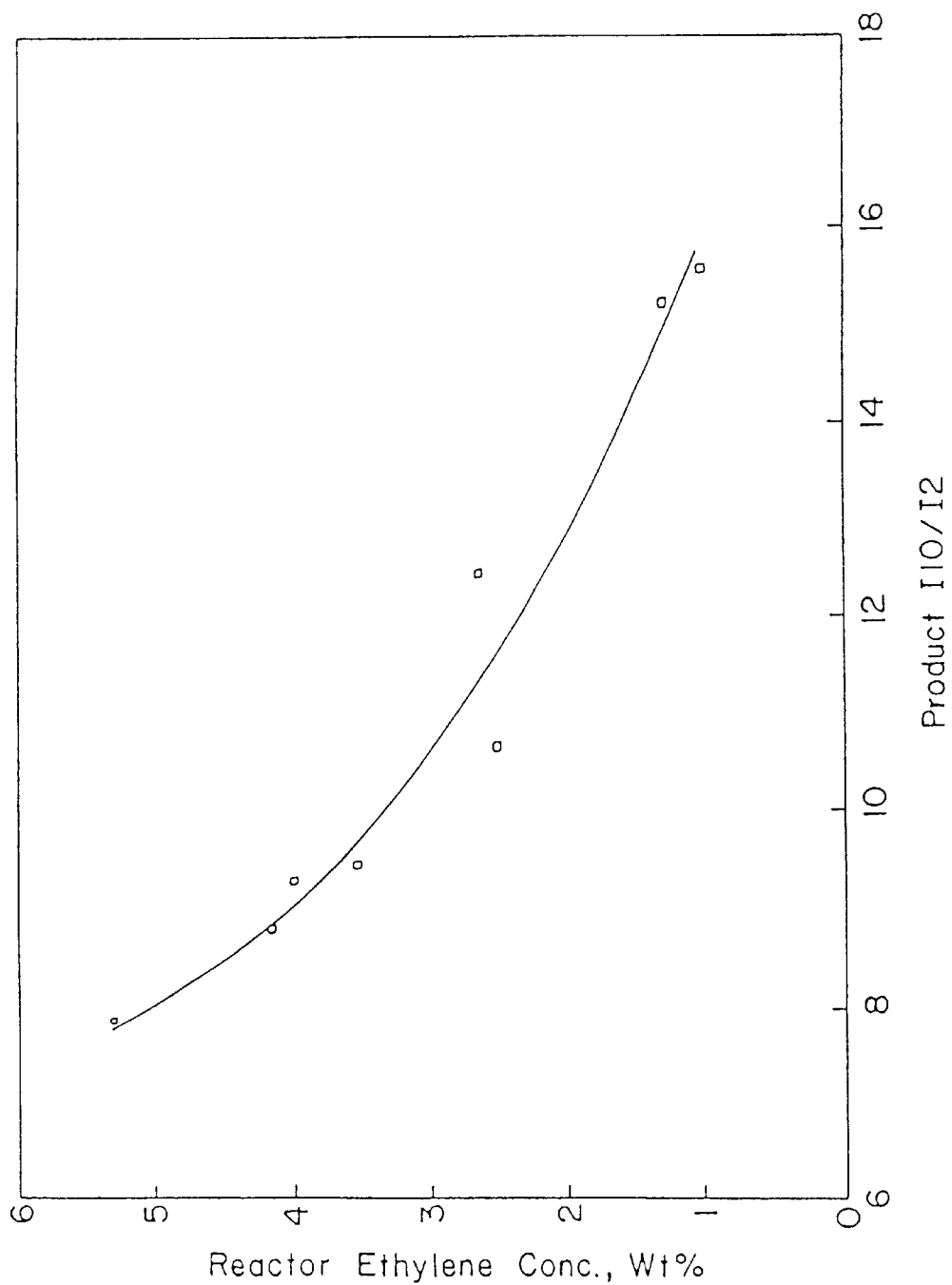
FIG. 7 graphically displays $I_{10}/I_2$ ratio as a function of ethylene concentration in the polymerization reactor for ethylene/propene substantially linear copolymers of the invention.

FIG. 7 graphically displays a best fit line drawn through a plot of the $I_{10}/I_2$ ratio for the ethylene/propene substantially linear polymers of Examples 28–35 as a function of ethylene concentration in the polymerization reactor. Surprisingly, in contrast to conventional Ziegler polymerized polymers and in contrast to a batch polymerization using the same catalyst and relatively high ethyelne concentrations, as the ethylene concentration in the reactor decreases using a continuous polymerization process, the $I_{10}/I_2$ ratio (indicating the amount of long chain branching in the novel substantially linear polymers) increases, even though the molecular weight distribution, $M_w/M_n$, remains very narrow and essentially constant at about 2.

Table 15 shows the critical shear stress and critical shear rate at OGMF and OSMF for Examples 28–35:

TABLE XV

| Example | OSMF | OGMF |
|---|---|---|
| 28 (shear stress) | $2.15 \times 10^6$ dyne/cm$^2$ | $4.09 \times 10^6$ dyne/cm$^2$ |
| 28 (shear rate) | 129.8 sec$^{-1}$ | 668.34 sec$^{-1}$ |
| 29 (shear stress) | $1.94 \times 10^6$ dyne/cm$^2$ | $4.3 \times 10^6$ dyne/cm$^2$ |
| 29 (shear rate) | 118.8 sec$^{-1}$ | 652.1 sec$^{-1}$ |
| 30 (shear stress) | $1.08 \times 10^6$ dyne/cm$^2$ | $4.3 \times 10^6$ dyne/cm$^2$ |
| 30 (shear rate) | 86.12 sec$^{-1}$ | 650.7 sec$^{-1}$ |
| 31 (shear stress) | $1.08 \times 10^6$ dyne/cm$^2$ | $>4.3 \times 10^6$ dyne/cm$^2$ |
| 31 (shear rate) | 90.45 sec$^{-1}$ | $>6.83$ sec$^{-1}$ |
| 32 (shear stress) | $1.94 \times 10^6$ dyne/cm$^2$ | $3.66 \times 10^6$ dyne/cm$^2$ |
| 32 (shear rate) | 178.2 sec$^{-1}$ | 673 sec$^{-1}$ |
| 33 (shear stress) | $2.15 \times 10^6$ dyne/cm$^2$ | about $3.23 \times 10^6$ dyne/cm$^2$ |
| 33 (shear rate) | 235.7 sec$^{-1}$ | about 591 sec$^{-1}$ |
| 34 (shear stress) | $1.94 \times 10^6$ dyne/cm$^2$ | $3.44 \times 10^6$ dyne/cm$^2$ |
| 34 (shear rate) | 204.13 sec$^{-1}$ | 725.23 sec$^{-1}$ |
| 35 (shear stress) | $1.94 \times 10^6$ dyne/cm$^2$ | about $3.26 \times 10^6$ dyne/cm$^2$ |
| 35 (shear rate) | 274.46 sec$^{-1}$ | 637.7 sec$^{-1}$ |

Table XVI and XVIA describe the polymerization conditions and Table XVII describes the resultant polymer physical properties for ethylene/1-butene copolymer Examples 36 and 37:

TABLE XVI

| Ex. | Reactor ethylene conc. (weight percent) | Reactor PE conc (weight percent) | Ethylene flow rate (lbs/hr) | Hydrogen/ethylene ratio (mole percent) |
|---|---|---|---|---|
| 36 | 5.3 | 5.8 | 3.20 | 0.035 |
| 37 | 1.3 | 10.8 | 3.19 | 0.010 |

TABLE XVIA

| Ex. | Reactor temp (C) | Diluent/Ethylene Ratio | Ethylene Conversion (%) | Comonomer/olefin ratio* |
|---|---|---|---|---|
| 36 | 170 | 8.1 | 51 | 24.2 |
| 37 | 152 | 8.2 | 87 | 17.1 |

*Comonomer/total olefin ratio = percentage weight ratio of 1-butene/(1-butene + ethylene).

TABLE XVII

| Ex. | I$_2$ (gms/10 minutes) | I$_{10}$/I$_2$ | Density (gm/cm$^3$) | M$_w$/M$_n$ |
|---|---|---|---|---|
| 36 | 0.59 | 7.5 | 0.9201 | 2.06 |
| 37 | 1.03 | 11.4 | 0.9146 | 2.22 |

The data in Tables XVI, XVIA and XVII show that as the ethylene concentration in the reactor decreases while using the constrained geometry catalyst as described herein, the I$_{10}$/I$_2$ ratio of the novel substantially linear polymers increases, indicating the amount of long chain branching in the novel polymers, even while the molecular weight distribution, M$_w$/M$_n$, of the novel polymers remains narrow at essentially about 2.

Table XVIII shows the critical shear suss and critical shear rate at OGMF and OSMF for Examples 36 and 37:

TABLE XVIII

| Example | OSMF | OGMF |
|---|---|---|
| 36 (shear stress) | $1.94 \times 10^6$ dyne/cm$^2$ | $4.09 \times 10^6$ dyne/cm$^2$ |
| 36 (shear rate) | 52.3 sec$^{-1}$ | 234.45 sec$^{-1}$ |
| 37 (shear stress) | $1.08 \times 10^6$ dyne/cm$^2$ | $3.01 \times 10^6$ dyne/cm$^2$ |
| 37 (shear rate) | 160.5 sec$^{-1}$ | 493.9 sec$^{-1}$ |

Comparative Example 38

An ethylene polymer, as described in U.S. Pat. No. 5,218,071, is polymerized according to the teachings of that patent and tested for melt fracture properties.

All catalyst manipulations were performed under anhydrous, anaerobic conditions in an inert atmosphere box. The solvents, toluene and Isopar E, and the comonomer, octene-1, were thoroughly dried and deaerated beore use. poly(methylalurnioxane) (PMAO) was obtained from AKZO Chemicals Inc. as a 1.55 M Al in toluene solution and used as received The metallocene ethylenebis(indenyl) hafnium dichloride was obtained rom Schering A. G. as a solid. This metallocene is known to contain 0.2 weight percent Zirconium contamination. A slurry of the hafnium complex was prepared from this solid (0.253 g; 0.5 mmol; 0.010 M) and 50 mL toluene. The slurry was thoroughly stirred overnight prior to use.

A one gallon, stirred autoclave reactor was charged with Isopar E (2.1 L) and octene-1 (175 mL) and the contents heated to 80 C. Upon reaching temperature, a sample of the PMAO (26.8 mL; 40.0 mmol Al) in toluene was pressured into the reactor from a 75 mL cylinder using a nitrogen flush. After a few minutes, an aliquot of the metallocene slurry (4.0 mL; 0.040 mmol; Al:Hf=1000:1) was flushed into the reactor in a similar manner. Ethylene was continuously supplied to the reactor at a rate of 17 g/min to initiate polymerization. The ethylene flow was maintained for ten minutes and during the latter part of the polymerization the flow rate slowed as the pressure approached a setpoint of 100 psig. After this time, the ethylene supply was shut off and the contents of the reactor transferred by pressure to a glass resin kettle containing a small amount of antioxidant (0.30 g Irgaphos 168; 0.07 g rganox 1010). The solvent was slowly allowed to evaporate and the polymer obtained form the solution was dried under vacuum at 50 C. for 72 h. The yield of the product was 159 g or an efficiency of 3975 g PE/mmol Hf.

The recovered polymer had a M$_w$=1.341×10$^5$, M$_n$=5.65× 10$^4$, M$_w$/M$_n$=2.373, density (measured in a gradien column)=0.8745 g/cc, I$_2$=0.63 g/10 min., I$_{10}$/I$_2$=15.9, and had two distinct melting peaks (as shown in FIG. 8). The polymer showed two peak melting points, one at 30.56 C. and the other at 102.55 C. The polymer also showed two peak crystallization points, one at 9.47 C. and the other at 81.61 C.

Melt fracture was determined using the GER at 190 C. with a die having a diameter of 0.0145 inches and an L/D=20.

We claim:

1. A fabricated article made from an ethylene polymer containing less than about 20 ppm aluminum, the polymer having:
   a) a melt flow ratio, $I_{10}/I_2$, $\geq 5.63$,
   b) a molecular weight distribution, $M_w/M_n$, defined by the equation:

$$M_w/M_n \leq (I_{10}/I_2) - 4.63,$$

and
   c) a critical shear stress at onset of gross melt fracture greater than about $4 \times 10^6$ dyne/cm$^2$, and
   d) a single melting point as determined by differential scanning calorimetry between −30 C. and 150 C.

2. A fabricated article made from an ethylene polymer containing less than about 20 ppm aluminum, the polymer having:
   a) a melt flow ratio, $I_{10}/I_2$, $\geq 5.63$,
   b) a molecular weight distribution, $M_w/M_n$, defined by the equation:

$$M_w/M_n \leq (I_{10}/I_2) - 4.63,$$

and
   c) a critical shear stress at onset of surface melt fracture at least 50 percent greater than the critical shear rate at the onset of surface melt fracture of a linear ethylene polymer having an $I_2$, $M_w/M_n$ and density within ten percent of the ethylene polymer, and
   d) a single melting point as determined by differential scanning calorimetry between −30 C. and 150 C.

3. A fabricated article made from an ethylene polymer containing less than about 20 ppm aluminum, the polymer having:
   a) a melt flow ratio, $I_{10}/I_2$, $\geq 5.63$,
   b) a molecular weight distribution, $M_w/M_n$ of from about 1.5 to about 2.5, and a single melting peak as determined by differential scanning calorimetry between −30 C. and 150 C.

4. A fabricated article made from an ethylene polymer containing less than about 20 ppm aluminum, the polymer having:
   a) a melt flow ration, $I_{10}/I_2$, $\geq 5.63$,
   b) a molecular weight distribution, $M_w/M_n$ of from about 1.5 to about 2.5, and
   c) a critical shear stress at onset of surface melt fracture at least 50 percent greater than the critical shear rate at the onset of surface melt fracture of a linear ethylene polymer having an $I_2$, $M_w/M_n$ and density within ten percent of the ethylene polymer, and
   d) a single melting peak as determined by differential scanning calorimetry between −30 C. and 150 C.

5. A fabricated article made from an ethylene polymer containing less than abut 20 ppm aluminum, the polymer having (i) a critical shear rate at onset of surface melt fracture of at least 50 percent greater than the critical shear rate at the onset of surface melt fracture of a linear ethylene polymer having an $I_2$, $M_w/M_n$ and density within ten percent of the ethylene polymer, and (ii) a single melting point as determined by differential scanning calorimetry between −30 C. and 150 C.

6. A fabricated article made from a substantially linear ethylene polymer containing less than about 20 ppm aluminum, the polymer having:
   a) from about 0.01 to about 3 long chain branches/1000 total carbons and
   b) a critical shear stress at onset of gross melt fracture of greater than about $4 \times 10^6$ dyne/cm$^2$, and
   c) a single melting point as determined by differential scanning calorimetry between −30 C. and 150 C.

7. A fabricated article made from a substantially linear ethylene polymer containing less than about 20 ppm aluminum, the polymer having:
   (a) from about 0.01 to about 3 long chain branches/1000 total carbons,
   (b) a critical shear rate at onset of surface melt fracture of at least 50 percent greater than the critical shear rate at the onset of surface melt fracture of a linear ethylene polymer having an $I_2$, $M_w/M_n$ and density within ten percent of the ethylene polymer, and
   (c) a single melting point as determined by differential scanning calorimetry between −30 C. and 150 C.

8. A fabricated article made from a substantially linear ethylene polymer containing less than about 20 ppm aluminum, the polymer having:
   (a) from about 0.01 to about 3 long chain branches/1000 total carbons,
   (b) a melt flow ratio, $I_{10}/I_2 \geq 5.63$, and
   (c) a molecular weight distribution, $M_w/M_n$ from about 1.5 to about 2.5, and
   (d) a single melting point as determined by differential scanning calorimetry between −30 C. and 150 C.

9. The fabricated article of any of claims 1–8, wherein the ethylene polymer is selected from the group consisting of:
   (A) an ethylene homopolymer, or
   (B) an interpolymer of ethylene with at least one $C_4$–$C_{18}$ diolefin.

10. The fabricated article of any of claims 1–8, wherein the ethylene polymer is selected from the group consisting of:
    (A) an ethylene homopolymer, and
    (B) an interpolymer of ethylene with at least one $C_3$–$C_{20}$ alpha-olefin.

11. The article of any of claims 1–8 fabricated into a film.

12. The article of any of claims 1–8 fabricated into a fiber.

13. The fabricated article of any of claims 1–8 made by a molding process.

* * * * *